United States Patent
Martin et al.

(10) Patent No.: US 8,466,095 B2
(45) Date of Patent: Jun. 18, 2013

(54) COMPOSITE MATERIAL CONSISTING OF A METAL MATRIX IN WHICH SYNTHETIC LAMELLAR PHYLLOSILICATED NANOPARTICLES ARE DISTRIBUTED

(75) Inventors: François Martin, Sainte Foy d' Aigrefeuille (FR); Jean-Pierre Bonino, Pechabou (FR); Pierre Micoud, Pibrac (FR); Jocelyne Ferret, Toulouse (FR); Cédric Lebre, Toulouse (FR); Vincent Baylac, Donneville (FR)

(73) Assignees: Centre National de la Recherche Scientifique (C.N.R.S.), Paris (FR); Luzenac Europe SAS, Toulouse (FR); Universite Paul Sabatier Toulouse III, Toulouse (FR)

( * ) Notice: Subject to any disclaimer, the term of this patent is extended or adjusted under 35 U.S.C. 154(b) by 343 days.

(21) Appl. No.: 12/809,672

(22) PCT Filed: Dec. 18, 2008

(86) PCT No.: PCT/FR2008/052351
§ 371 (c)(1),
(2), (4) Date: Aug. 23, 2010

(87) PCT Pub. No.: WO2009/081046
PCT Pub. Date: Jul. 2, 2009

(65) Prior Publication Data
US 2011/0015102 A1    Jan. 20, 2011

(30) Foreign Application Priority Data
Dec. 19, 2007 (FR) ..................... 07 08875

(51) Int. Cl.
*C10M 103/04* (2006.01)
*C10M 103/06* (2006.01)

(52) U.S. Cl.
USPC ........................................ 508/103; 508/107

(58) Field of Classification Search
USPC ............................................... 508/103, 107
See application file for complete search history.

(56) References Cited

U.S. PATENT DOCUMENTS
2006/0162655 A1 *   7/2006  Martin et al. ............... 118/639
2009/0252963 A1 * 10/2009  Martin et al. ............... 428/402

FOREIGN PATENT DOCUMENTS
WO    2004063428       7/2004
WO    2004108815      12/2004
WO    WO 2008009801 A2 *  1/2008

OTHER PUBLICATIONS

Chang, Y. et al., "Process Aspects of the Electrolytic Codeposition of Molybdenum Disulfide with Nikel", Electrochimica Acta, 1998, pp. 315-324, vol. 43, Nos. 3-4, Pergamon Press and Elsevier Science Ltd., Great Britain.
Chen, W. et al., "Wear and Friction of Ni-P Electroless Composite Coating Including Inorganic Fullerene-WS2 Nanoparticles", Advanced Engineering Materials, 2002, pp. 686-690, vol. 4, No. 9, Wiley-VCH, Weinheim.
Ge, J. et al., "Structure & Properties of Electroless Ni-P-B4C Composite Coatings", Plating & Surface Finishing, Oct. 1998, pp. 69, 70 and 73.
Pushpavanam, M. et al., "Nikel-Boron Nitride Electrocomposites", Metal Finishing, Jun. 1995, pp. 97-99, Elsevier Science, Inc.
Hu, X. et al., "Zeta Potential & Codeposition of PTFE Particles Suspended in Electroless Nickel Solution", Plating & Surface Finishing, Mar. 1997, pp. 51-53.
International Search Report issued in the PCT application on May 20, 2009.
A. Decarreau et al, "Synthesis and stability of Mg and Ni-stevensites, kerolites and talcs between 80 and 240oC", XP008075903, C.R. Acad. Sci, Paris, t. 308, Serie II, p. 301-306, 1989 (English Abstract).

* cited by examiner

*Primary Examiner* — Jim Goloboy
(74) *Attorney, Agent, or Firm* — Young & Thompson

(57) ABSTRACT

The invention relates to a composite material including a metal matrix in which synthetic lamellar phyllosilicated mineral particles are distributed, characterized in that the lamellar phyllosilicated mineral particles are particles also called synthetic phyllosilicated nanoparticles (6) that are mineral, silico/germano-metal, lamellar, synthetic and hydrophilic, and have an average size of between 10 nm and 1 nm. The invention also relates to a substrate that comprises a lubricating coating consisting of such a material, and to an electrolytic deposition preparation method.

19 Claims, 18 Drawing Sheets

Figure 1:
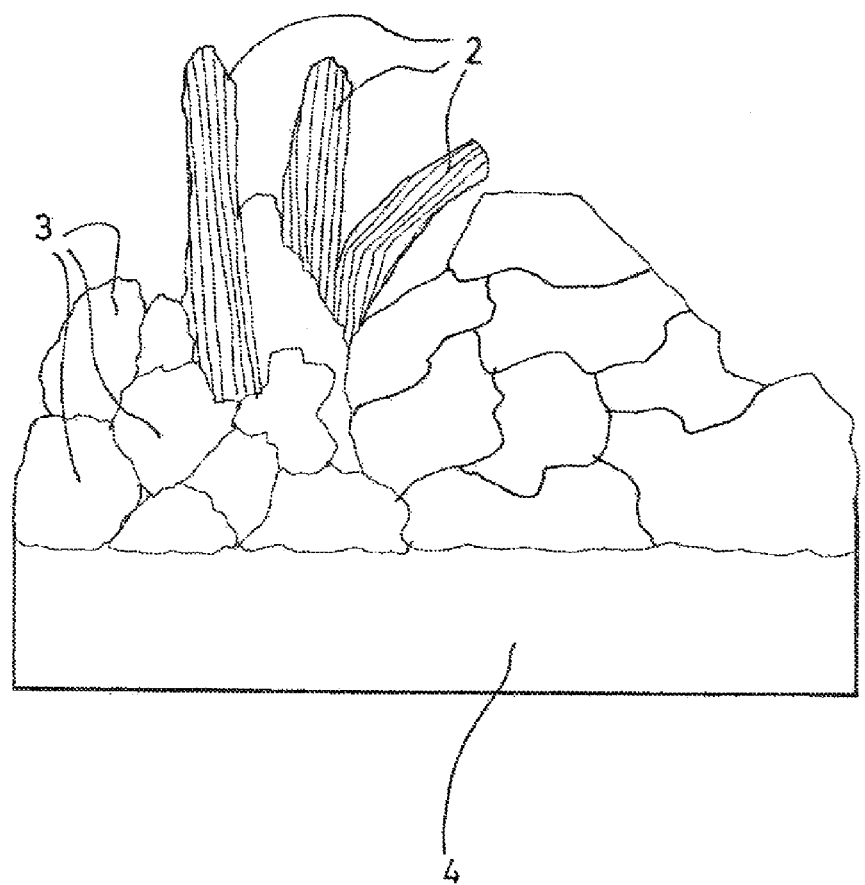

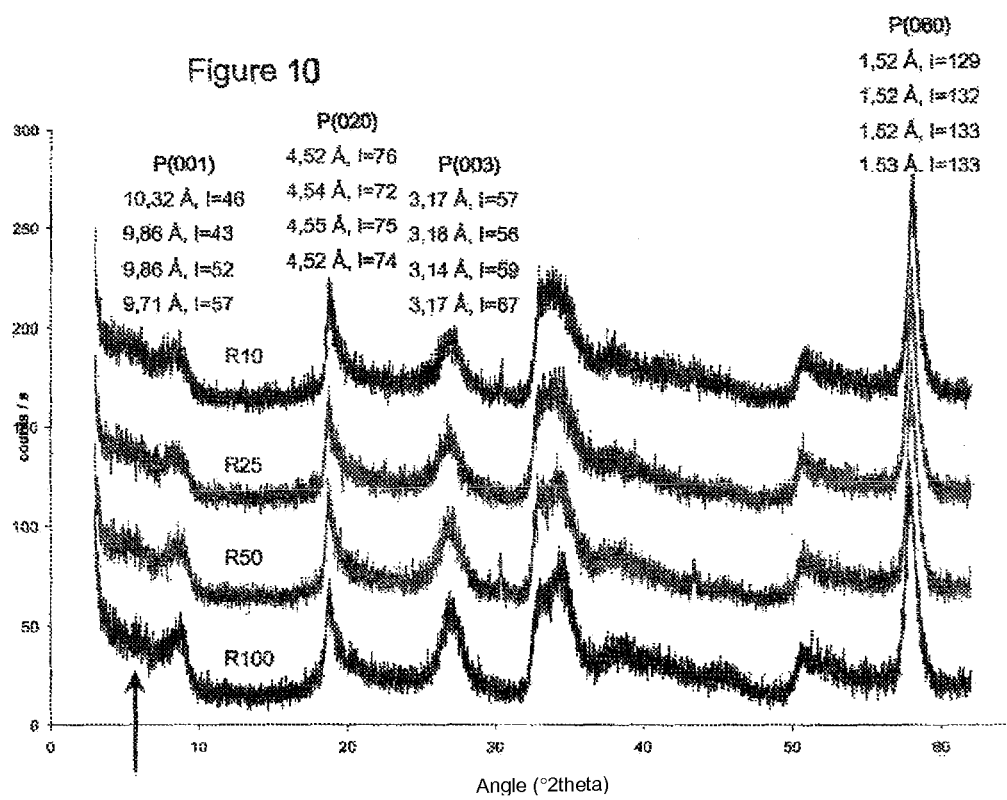
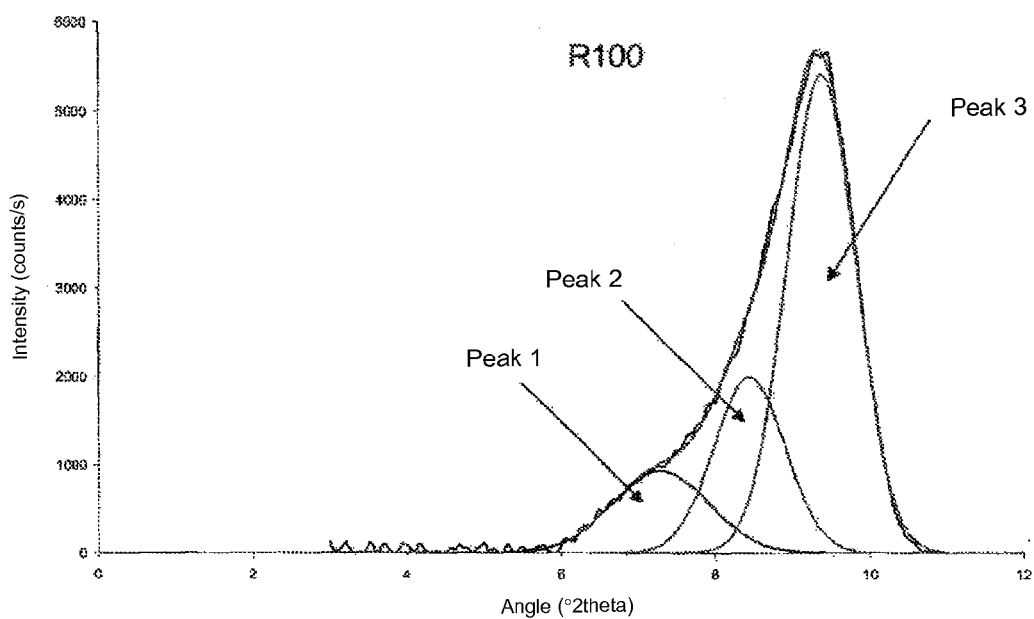

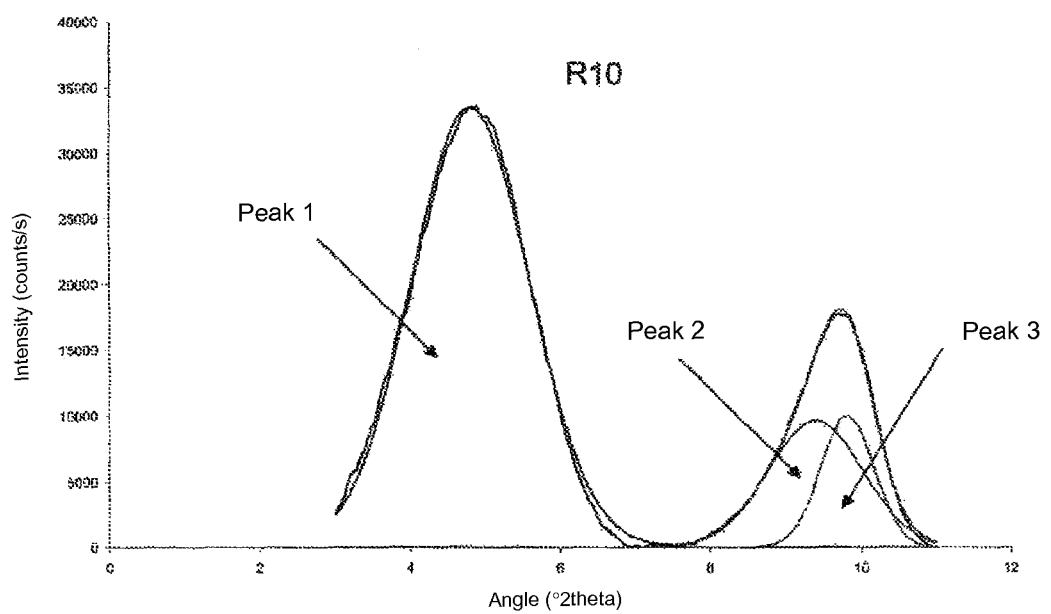

COMPOSITE MATERIAL CONSISTING OF A METAL MATRIX IN WHICH SYNTHETIC LAMELLAR PHYLLOSILICATED NANOPARTICLES ARE DISTRIBUTED

The invention relates to a composite material, to its use as a lubricating metal coating, and to a process for its production.

In many industrial fields, such as, for example, transport, connector technology or armaments, mechanical assemblies are used in which parts that are in contact move relative to one another. In many cases, it is desirable to treat the surfaces of the parts that are in contact in order to provide them, in addition to their basic properties, with lubricating properties that are stable at high temperatures, in order to increase the life and reliability of the mechanical assemblies in which surfaces are in contact.

It is known to deposit lubricating composite coatings by electrolytic processes, either chemically (electroless process) or electrochemically. A so-called "electroless" codeposition process on a substrate is a process in which particles are incorporated during the process of growth of a metal or alloy by catalyzed oxidation-reduction. An electrochemical codeposition process consists in incorporating particles during the process of growth of a metal or alloy on a substrate to be coated, starting from an electrolyte in an electrolysis cell.

For example, the deposition of a lubricating PTFE coating in a nickel-based metal matrix by an "electroless" process starting from a suspension of PTFE in a nickel precursor solution is known from X. Hu, et al., (Plating and surface finishing, March 1997). However, coatings of this nature are not stable, the PTFE being destroyed at temperatures higher than 300° C. The production of antifriction deposits of NiP incorporating mineral nanoparticles of fullerene-$WS_2$ by an "electroless" process is described especially by W. X. Chen, et al., [Advanced Engineering Materials, Vol. 4, No. 9, September 2002]. NiP—$B_4C$ lubricating coatings can also be deposited by the "electroless" technique [see J. P. Ge et al., Plating and surface finishing, October 1998].

Furthermore, Ni—$BN_h$ coatings are described by M. Pushpavanam, et al., [(Metal Finishing, June 1995)], and composite coatings of nickel charged with $MoS_2$ are described by Yu-Chi Chang, et al., [Electrochimica Acta, Vol. 43, Issues 3-4, 1998, p. 315-324]. In both cases, the coatings can be obtained electrochemically. However, boron nitrides have very low chemical resistance in acidic and basic media.

In addition, WO 2004/063428 describes a composite material comprising a metal matrix within which there are distributed natural talc particles having an average size below 15 μm and carrying at their surface a compound derived from cellulose, fixed by replacement of all or some of the hydroxyl groups, so as to provide the talc (which is naturally highly hydrophobic) with hydrophilic properties, permitting the formation of a suspension, without precaution, in an aqueous medium forming an electrolyte.

Nevertheless, this composite material has been found to have various disadvantages.

First of all, the modified natural talc particles are in the general form of flakes having hydrophilic zones located substantially in the region of the peripheral edges of the particles, the principal faces of the particles retaining hydrophobic properties. Consequently, when the composite material is produced by electrolytic (chemical or electrochemical) deposition, the talc particles are spontaneously oriented mainly with their principal faces extending in directions perpendicular to the surface of the substrate to be coated. This orientation is disadvantageous in terms of the desired lubricating properties, for which it would be, on the contrary, desirable for the laminae to be oriented mainly parallel to the surface of the substrate. Furthermore, in conjunction with the second disadvantage mentioned below, it causes considerable surface roughness, which is generally incompatible with applications in which there is desired a lubricating metal coating with surfaces in contact that are capable of sliding relative to one another. In order to correct that roughness, it is therefore necessary to subsequently carry out a step of grinding of the metal coating that has been produced. However, as well as being expensive, such a step also creates defects within the composite material constituting the coating, and in particular at the surface of the metal matrix, especially when it leads to displacement or removal of the protruding talc particles.

Furthermore, the particle size (fineness and particle size distribution of the pulverulent particles) of a natural talc depends substantially on the mechanical grinding techniques and equipment used. The powders obtained from a natural talc by mechanical grinding generally have a particle size of the order of from several micrometres to several hundred micrometres.

As well as causing a not inconsiderable fluctuation in the particle size distribution of the particles, mechanical grinding results in a gradual and significant structural deterioration of the talc and the appearance of numerous defects in its crystalline structure. The finer the grinding, the more the initial crystalline structure is altered thereby.

Accordingly, the finest particles of natural lamellar talc that can be obtained have an average size which is still greater than 1 μm and have a poorly controlled particle size distribution, which is often polymodal, non-symmetrical and with high dispersion. Consequently, the composite material includes natural talc particles of a relatively large size, in any case of the same size or of a greater order of magnitude than that of the metal grains which gradually form during the electrolytic deposition. These relatively large talc particles substantially affect the growth of the metal deposit and the oxidation-reduction and/or electrochemical phenomena that occur during the deposition.

Furthermore, natural talc compositions are not 100% pure. There is at present no divided solid composition of natural talc that is 100% pure; not all the particles of natural talc have the chemical formula $Si_4Mg_3O_{10}(OH)_2$, which is accordingly only very theoretical. The degree of purity (absence of mineralogical association with other minerals such as calcite, chlorite, pyrite, etc.) and the nature of the impurities (more or less high contents of Fe, Al, F, and traces of Mn, Ti, Cr, Ni, Ca, Na and/or K) of a natural talc are dependent on the parent deposit.

The result, in practice, is that the quality of the composite material obtained is inadequate, especially for use as a lubricating metal coating.

It will be noted that some natural talc compositions having a smaller average size and an improved particle size distribution have been described. Nevertheless, when the natural talc particles are ground to a size smaller than 1 μm, they lose their properties associated with their lamellar nature, which disappears. In fact, below that size, grinding probably causes as much, if not more, of a separation of the laminae than a reduction in the average radial size of the particles. Consequently, such nanometric natural talc particles are not lamellar and are therefore not suitable for the production of a composite material having lubricating properties. Moreover, implementation of the process of grafting a cellulose derivative onto such natural talc particles poses a problem.

The object of the invention is to remedy these disadvantages by proposing a composite material which has the advantages of the composite material described in WO 2004/063428 without having the above-mentioned disadvantages thereof.

Accordingly, it is an object of the invention to provide a composite material suitable for forming a lubricating metal coating which has properties of surface condition, homogeneity, hardness and wear resistance conventionally required for mechanical parts that are in contact and that move relative to one another in a mechanical assembly, and lubricating properties that are stable at high temperatures, for example of the order of 800° C., without requiring a grinding step.

More particularly, it is an object of the invention to provide such a composite material whose mechanical properties are substantially those of the metal matrix of which it is composed, but whose coefficient of dynamic friction and coefficient of friction under restricted movements are greatly reduced. In other words, it is an object of the invention to propose such a composite material in which the tribological properties are improved (coefficients of friction, wear rate, etc.) but in which the other mechanical properties (strength, moduli of elasticity, hardness, etc.) are retained and correspond at least substantially to those of its metal matrix.

Accordingly, the present invention relates to a composite material, its use as a self-lubricating coating for a substrate, and a process for its production.

The invention therefore relates to a composite material comprising a metal matrix within which lamellar phyllosilicated mineral particles are distributed, characterized in that the lamellar phyllosilicated mineral particles are hydrophilic synthetic lamellar silico/germano-metallic mineral particles, called synthetic phyllosilicated nanoparticles, having an average size of from 10 nm to 1 μm.

More particularly, the composite material according to the invention is composed of a metal matrix within which there are distributed synthetic phyllosilicated nanoparticles which are lamellar and hydrophilic.

The synthetic phyllosilicated nanoparticles of a composite material according to the invention can have different variants, provided that they are lamellar, hydrophilic and compatible with its production process. In a composite material according to the invention, the nanoparticles are actually embedded in the metal grains of the metal matrix and do not substantially impair the quality and homogeneity of the metal matrix.

The inventors have succeeded in particular in obtaining synthetic phyllosilicated nanoparticles which have those properties and remain stable up to high temperatures, typically of the order of from 700° C. to 800° C., and which can be obtained with a monodisperse and unimodal particle size distribution. These synthetic phyllosilicated nanoparticles are therefore particularly suitable for forming a composite material according to the invention which can be used as a lubricating metal coating.

Accordingly, advantageously, in a first variant, a composite material according to the invention comprises, as synthetic phyllosilicated nanoparticles, nanoparticles, called synthetic silico/germano-metallic nanoparticles, of the formula —$(Si_xGe_{1-x})_4M_3O_{10}(OH)_2$— in which:

M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) being a real number of the interval [0; 1], such that $$\sum_{i=1}^{8} y(i) = 1,$$

x is a real number of the interval [0; 1],
an X-ray diffraction analysis of said synthetic silico/germano-metallic mineral nanoparticles yields a diffractogram exhibiting the following characteristic diffraction peaks:
a peak located at a distance of the order of 9.40-9.68 Å, for a plane (001);
a peak located at 4.50-4.75 Å, for a plane (020);
a peak located at 3.10-3.20 Å, for a plane (003);
a peak located at 1.50-1.55 Å, for a plane (060).
The synthetic silico/germano-metallic nanoparticles have a crystalline and lamellar structure.
y(i) refers to the ratio [number of octahedral sites occupied by a metal cation (i) in question]/[total number of octahedral sites].
x corresponds to the following ratio:

$$\frac{\text{number of tetrahedral sites occupied by the Si}^{4+} \text{ cations}}{\text{total number of tetrahedral sites}}$$

First Preparation Process

A first process for the preparation of such synthetic silico/germano-metallic nanoparticles according to the invention is characterized by hydrothermal treatment of a silico/germano-metallic gel of the formula —$(Si_xGe_{1-x})_4M_3O_{11}$,n'$H_2O$—, in the liquid state.

Preparation of the Gel

In a first step, an initial coprecipitate is formed by a reaction between a sodium metasilicate solution and a magnesium (or nickel) chloride solution. There is then obtained a highly hydrated silicometallic gel which is gelatinous in consistency and has the chemical formula: $Si_4Mg_3O_{11}$,n'$H_2O$ (or $Si_4Ni_3O_{11}$,n'$H_2O$). A series of steps of centrifugation and washing with distilled water allows the silicometallic gel to be freed of the NaCl formed at the end of the coprecipitation reaction. n' denotes the number of molecules of water trapped in the hydrated gel. The starting silico/germano-metallic gel, which is subjected directly to the hydrothermal treatment, is in the form of a highly hydrated substance having a gelatinous consistency. Owing to its thixotropic behaviour, the gel can be rendered liquid by simple mechanical stirring.

According to a particular embodiment, the starting silico/germano-metallic gel is prepared by a coprecipitation reaction between:
a liquid composition comprising at least one saline solution selected from: a solution of sodium metasilicate ($Na_2OSiO_2$) and a solution of sodium metagermanate ($Na_2OGeO_2$); the respective amounts of the two solutions being chosen to obtain a liquid composition having the following molar concentration ratios:

$$\frac{[Na_2OSiO_2]}{[Na_2OSiO_2] + [Na_2OGeO_2]} = x \text{ and}$$

$$\frac{[Na_2OGeO_2]}{[Na_2OSiO_2] + [Na_2OGeO_2]} = 1 - x;$$

and
a solution of metal chloride(s) ($MCl_2$) comprising at least one divalent metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); with a molar concentration ratio for each of said metal chlorides such that:

$$\frac{[\text{divalent metal}]_{(i)}}{[M]_{(total)}} = y(i);$$

in the presence of a hydrochloric acid solution.

In so doing, the following chemical reaction is carried out:

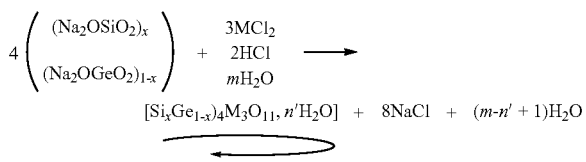

$$[Si_xGe_{1-x}]_4M_3O_{11}, n'H_2O] + 8NaCl + (m-n'+1)H_2O$$

m, n' and (m-n'+1) being positive integers.

The preparation of this type of gel is widely known and, by way of example, the instructions given in the publication Decarreau et al., 1989 ("Synthèse et stabilité des stévensites kérolites et talcs, magnésiens et nickélifères, entre 80 et 240° C."

R. Acad. Scie. Paris—, t. 308, series II, p. 301-306) can be followed.

Advantageously and in practice, in order to prepare the silico/germano-metallic gel of the formula $(Si_xGe_{1-x})_4M_3O_{11}$, n'$H_2O$, the following steps are carried out in succession:

an acidic composition of metal chloride ($MCl_2$, n$H_2O$) is prepared by dissolving in a volume of water an appropriate amount of a composition of hygroscopic crystals of at least one metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); then hydrochloric acid (HCl) is added thereto, a liquid composition is prepared by dissolving in an appropriate volume of water an amount of at least one salt selected from: sodium metasilicate and sodium metagermanate, the two aqueous compositions are mixed in proportions chosen (stoichiometry of a talc (Si—Ge)$_4$/M$_3$) to cause the formation of a coprecipitation gel.

The amounts of the various reagents that are used are chosen so that the $Na^+$ and $Cl^-$ ions are present in equimolar amounts at the end of the coprecipitation reaction. The saline solution ($Na^-$, $Cl^-$) so formed can be removed simply by carrying out a liquid/solid separation.

Once the coprecipitation has taken place, the silico/germano-metallic gel is recovered, for example by centrifugation or filtration, and is subjected to a hydrothermal treatment according to the invention. By thus recovering the coprecipitation gel, it is at the same time freed of the $Na^+$ and $Cl^-$ ions, which are particularly harmful for successful crystallisation of the synthetic silico/germano-metallic nanoparticles.

Advantageously, once the coprecipitation gel has been recovered, it is washed at least once with distilled water, especially in order to free it of all the $Na^+$ and $Cl^-$ ions of reaction. Washing can also be carried out with osmozed water or simply with tap water.

Hydrothermal Treatment

In said first process, said hydrothermal treatment is carried out for a period of time and at a temperature of from 300° C. to 500° C., which are chosen in dependence on the particle size and structural stability desired for the synthetic silico/germano-metallic nanoparticles which are to be prepared.

In order to carry out the hydrothermal treatment of the silico/germano-metallic gel, the supplementary addition of water can preferably be envisaged in order to prevent calcination of the solid fraction (the starting gel, the final product, any intermediate products). The necessity of such an addition of water and the minimum amount of water to be added in order to avoid calcination depend substantially on the degree of hydration of the initial gel, on the treatment temperature, and on the duration of the treatment.

The duration of the hydrothermal treatment, which can range from one day to several days, has a major influence especially on the crystallinity of the synthetic mineral that is ultimately obtained.

This first process for the preparation of synthetic silico/germano-metallic nanoparticles is the result of the following essential and surprising findings:

firstly, a hydrothermal treatment carried out at relatively high temperatures (in relation to the temperature of 110-240° C. recommended in the publication Decarreau et al., 1989) of from 300° C. to 500° C. results in the formation of synthetic mineral particles having structural characteristics (especially lamellarity, crystallinity) which are very similar to those of natural talcs, and excellent thermal stability, secondly, this first preparation process, especially in dependence on the chosen temperature, permits the synthesis, in an extremely simple manner, of synthetic silico/germano-metallic nanoparticles which are stable and pure and whose size and crystalline properties are very precisely defined and foreseeable.

Advantageously, the hydrothermal treatment of said silico/germano-metallic gel is carried out by means of an autoclave. Preferably, a steel autoclave having an inner lining of titanium or of stainless steel is used.

Advantageously, there is added to the autoclave, with said silico/germano-metallic gel, an amount of water (preferably distilled water) that is at least sufficient to create a saturation vapour atmosphere inside the autoclave brought to the treatment temperature.

Advantageously and according to a variant of this first preparation process, said hydrothermal treatment is carried out at a controlled pressure of the order of 16 bar.

Advantageously, the hydrothermal treatment is carried out with a liquefied silico/germano-metallic gel having a liquid/solid ratio of the order of 0.83; the amount of liquid being expressed in cm$^3$ and the amount of solid in grams. An appropriate amount of water to achieve that ratio is optionally added to said liquefied silico/germano-metallic gel if necessary.

Advantageously and according to the invention, the hydrothermal treatment is carried out with stirring. To that end, a bar magnet, for example, can be arranged inside the autoclave.

At the end of a hydrothermal treatment according to this first preparation process there is obtained a composition which is in the form of a colloidal solution containing said synthetic silico/germano-metallic nanoparticles. The synthetic mineral nanoparticles, in solution in water, can be in an individualized state relative to one another. The particle size of such elementary nanoparticles can vary between 10 nm and 1 μm depending on the temperature used in the hydrothermal treatment, which temperature is chosen from 300° C. to 500° C. Preferably, the temperature of the hydrothermal treatment is below 400° C.

Post-Treatment

At the end of the hydrothermal treatment, a colloidal composition is recovered. In a first variant of the invention, this colloidal composition is used directly for incorporation into a composite material according to the invention, especially within the context of a process for the electrolytic deposition of a coating composed of such a composite material on a substrate.

In another variant, said colloidal composition is subjected to a drying step followed by a mechanical grinding step to give a talcose composition comprising perfectly individualized synthetic silico/germano-metallic nanoparticles. Any aggregates contained in the composition are thus reduced to individualized elementary nanoparticles. It will be noted, however, that this mechanical grinding step does not have the effect of reducing the size of the nanoparticles, but merely of breaking up any aggregates resulting from the preparation process. It therefore does not impair the lamellarity and crystallinity of the nanoparticles in any way. The particle size distribution of the resulting elementary synthetic silico/germano-metallic nanoparticles is substantially unimodal and monodisperse.

Advantageously, drying can be carried out by means of an oven; for example at a temperature of the order of 60° C. for at least one to two days. Grinding is advantageously carried out mechanically; for example using a mortar, preferably made of agate in order to avoid any risk of contamination of the talcose composition.

Advantageously, the hydrothermal treatment is carried out at a temperature of the order of 300° C., for example for a period of the order of 3 days. There can then ultimately be obtained, for example, elementary synthetic silico/germano-metallic nanoparticles whose particle size is from 20 nm to 100 nm.

Compositions Obtained by the First Preparation Process

It will be noted in particular that this first preparation process makes it possible to obtain compositions of synthetic silico/germano-metallic nanoparticles which all have the same chemical entity. In the present case, they are synthetic silico/germano-metallic nanoparticles corresponding to the formula $(Si_xGe_{1-x})_4M_3O_{10}(OH)_2$ as indicated above.

In that chemical formula $(Si_xGe_{1-x})_4M_3O_{10}(OH)_2$, Si and Ge refer to the silicon ions and/or germanium ions which occupy the tetrahedral sites of the crystal lattice. M denotes the divalent metal cations of the octahedral sites (for example $Mg^{2+}$, $Co^{2-}$, $Mn^{2+}$, $Zn^{2+}$, $Cu^{2+}$, $Fe^{2+}$, $Ni^{2+}$ and/or $Cr^{2+}$).

In particular, this first preparation process makes it possible to obtain, as synthetic silico/germano-metallic nanoparticles, mineral nanoparticles corresponding to the chemical formula $Si_4Mg_3O_{10}(OH)_2$. These are nanoparticles which can be described as "synthetic talcose nanoparticles", whose chemical structure is identical to that of a natural talc, but which are lamellar, crystalline and pure and have a monodisperse and unimodal particle size, with an average size which can be from 10 nm to 1 μm.

Analyses carried out by X-ray diffraction and infrared spectroscopy have shown that a hydrothermal treatment according to the invention, when applied directly to a silicometallic gel of the chemical formula $Si_4Mg_3O_{11}$, n'$H_2O$ (that is to say a silico/germano-metallic gel of the chemical formula $(Si_xGe_{1-x})_4M_3O_{11}$, n'$H_2O$, in which x is equal to 1 and M denotes magnesium), yields a colloidal composition of synthetic talc in which the particles in suspension exhibit a high degree of similarity, in particular in terms of crystallinity and lamellarity, with a natural talc (which finding was made especially on the basis of spectra prepared in transmission in the mid-infrared range and in diffuse reflection in the near-infrared range).

It will be noted, however, that a composition of synthetic talcose nanoparticles prepared according to the first preparation process (that is to say of the formula $(Si_xGe_{1-x})_4M_3O_{10}(OH)_2$ in which x is equal to 1 and M denotes magnesium) differs from a composition of natural talc especially by its purity. In particular, the synthetic talcose nanoparticles are exclusively particles of the chemical formula $Si_4Mg_3O_{10}(OH)_2$. There is at present, however, no pulverulent composition prepared from natural talc that is 100% pure.

In particular, in X-ray diffraction, the diffractogram corresponding to these synthetic talcose nanoparticles exhibits a characteristic diffraction peak located at a distance of the order of 9.40-9.70 Å and corresponding to a plane (001). For a natural talc, the corresponding diffraction peak is located at a distance of the order of 9.35 Å.

Likewise, the synthetic talcose nanoparticles exhibit a crystallinity of good quality together with an extremely fine particle size, which can be from 10 nm to 1 μm. In fact, with the current state of grinding techniques, particles having such a fineness can be obtained from a natural talc only with severe "amorphization" (reduction in crystallinity) of the product. In X-ray diffraction, such amorphization manifests itself especially in a reduction in the intensity of the characteristic diffraction peaks, which are especially the peaks located at: 9.35 Å for the plane (001), 4.55 Å for the plane (020), 3.14 Å for the plane (003) and 1.52 Å for the plane (060).

These analyses have likewise shown that said first preparation process can be applied generally to all silico/germano-metallic gels corresponding to the chemical formula $(Si_xGe_{1-x})_4M_3O_{11}$, n'$H_2O$. This first preparation process accordingly permits the synthesis of compositions comprising synthetic silico/germano-metallic nanoparticles of the formula $(Si_xGe_{1-x})_4M_3O_{10}(OH)_2$, which also share large structural similarities with natural talcs.

The synthetic silico/germano-metallic nanoparticles have a nanometric organization in the form of superposed laminae; each lamina has a crystalline structure composed of a layer of octahedrons (occupied by divalent metal ions: $Mg^{2+}$, $Co^{2+}$, $Zn^{2+}$, $Cu^{2+}$, $Mn^{2+}$, $Fe^{2+}$ and/or $Ni^{2+}$) intercalated between two layers of inverse tetrahedrons (occupied by the $Si^{4+}$ and/or $Ge^{4+}$ ions).

The first preparation process therefore makes it possible to obtain compositions analogous to a talc composition, for example so-called "germanium-containing" compositions, that is to say compositions comprising nanoparticles whose crystalline structure is similar to that of talc but in which at least some of the $Si^{4+}$ cations of the tetrahedral sites are replaced by $Ge^{4+}$ cations. Likewise, they can be so-called "derived" or "functionalized" compositions, for example when the magnesium ions of the octahedral sites are replaced, in variable proportions, by other divalent cations in order to obtain nanoparticles having improved physical, especially optical and/or electrical, properties as compared with nanoparticles of natural talc.

In addition to X-ray diffraction methods, infrared analyses also enable the synthetic silico/germano-metallic nanoparticles so obtained to be distinguished not only with respect to natural talcs, but also with respect to other known phyllosilicates, such as, for example, kerolites, stevensites, smectites.

The synthetic silico/germano-metallic nanoparticles are characterized by their crystalline and lamellar structure, analysis of which by X-ray diffraction yields a diffractogram having the characteristic diffraction peaks mentioned above.

Advantageously, the synthetic silico/germano-metallic nanoparticles which are obtained and incorporated into a composite material according to the invention have a diffraction peak of the plane (001) located at a distance of the order of 9.55-9.65 Å.

The synthetic silico/germano-metallic nanoparticles also have the feature of being able to exhibit more or less strong shades of colour, which depend on the nature of the divalent metal cations ($Mg^{2+}$, $Co^{2+}$, $Zn^{2+}$, $Cu^{2+}$, $Mn^{2+}$, $Fe^{2-}$, $Ni^{2+}$, $Cr^{2+}$) and the proportion thereof in the crystal lattice.

For example, the synthetic silico/germano-metallic nanoparticles have a strong green colour or a pale green colour when $Ni^{2+}$ cations are preferred, at least in part, to $Mg^{2+}$ cations (of a conventional talc) for occupying the octahedral sites of the crystal lattice.

Likewise, when the octahedral sites of the crystal lattice are occupied, at least in part, by:
   $Co^{2+}$ cations, the talcose compositions have a more or less pronounced pink colour,
   $Cu^{2+}$ cations, the talcose compositions have a more or less pronounced blue colour,
   $Mn^{2+}$ cations, the talcose compositions are chocolate in colour,
   $Fe^{2+}$ cations, the talcose compositions have a colour which varies between grey and rust,
   $Zn^{2+}$ cations, the talcose compositions are white in colour,
   $Cr^{2+}$ cations, the talcose compositions have a colour which varies from green to blue.

It will be noted in this connection that, although natural talcs in rock form can have different colours (green, pink, honey, etc.), grinding them to fine particles yields pulverulent products that are always white. The colour of a block of natural talc is in fact due not to coloured centres peculiar to the chemical composition of the material but to the particular arrangement of the talc particles relative to one another; grinding to fine particles makes the whole uniform and results in the loss of colour.

The first preparation process therefore makes it possible to obtain synthetic phyllosilicated nanoparticles which are coloured despite their high degree of fineness. A composite material according to the invention can therefore be coloured while retaining the properties mentioned above.

Likewise, on the basis of that same principle of replacing the $Mg^{2+}$ cations by other divalent cations, in dependence on the divalent cation(s) chosen to occupy the octahedral sites of the crystal lattice, the synthetic silico/germano-metallic nanoparticles can differ markedly from particles of natural talc in terms of their properties of electrical and/or thermal conductance.

Consequently, the properties of electrical and/or thermal conductance of a composite material according to the invention can be adjusted at least partially in dependence on those of its synthetic phyllosilicated nanoparticles.

Second Preparation Process

In a variant, synthetic talcose nanoparticles as mentioned above, which are suitable for incorporation into a composite material according to the invention as synthetic phyllosilicated nanoparticles, can be prepared according to a second preparation process.

In the second preparation process, a kerolite composition is subjected to an anhydrous thermal treatment carried out at a pressure lower than 5 bar, for a period of time (especially ranging from several hours to several days) and at a treatment temperature greater than 300° C. The duration and the temperature of the anhydrous thermal treatment are chosen so as to obtain thermally stable synthetic talc particles having the formula $Si_4Mg_3O_{10}(OH)_2$.

This second preparation process is the result of the essential and surprising finding that an anhydrous thermal treatment carried out at a temperature at least greater than 300° C. allows a kerolite composition to be converted in an extremely simple manner into a composition of synthetic talcose nanoparticles, that composition being stable and pure, having characteristics that are very precisely defined and foreseeable.

Most particularly, the inventors have demonstrated that an anhydrous thermal treatment has the effect of inducing a gradual reorganization of the "pseudocrystalline and hydrated" lamellar structure of a kerolite by reducing the voids in the crystal lattice, and the release of the molecules of water trapped in the interfoliar spaces.

An anhydrous thermal treatment carried out at 300° C. effectively allows notable modifications to the structure of the kerolites to be induced (which modifications are detectable especially by methods of infrared and X-ray diffraction analysis), capable of yielding synthetic talcose nanoparticles.

Advantageously and according to the invention, the anhydrous thermal treatment is therefore carried out at a temperature of the order of from 500 to 550° C. At such a temperature, synthetic talcose nanoparticles are obtained in about 5 hours. Advantageously and according to the invention, in order to obtain thermally stable synthetic talcose nanoparticles, the treatment time is greater than 5 hours.

Advantageously and according to the invention, the anhydrous thermal treatment is carried out in ambient air, inside a crucible, for example made of ceramics or of any other material suitable for the treatment temperature.

Directly following an anhydrous thermal treatment there is recovered a solid, crude substance which is white in colour and corresponds to more or less coarse aggregates formed of mutually aggregated elementary synthetic talcose nanoparticles. Advantageously, at the end of the anhydrous thermal treatment, mechanical grinding is provided in order to loosen the aggregates into individualized elementary synthetic talcose nanoparticles and thus obtain a pulverulent composition. The size distribution of the elementary synthetic talcose nanoparticles is substantially unimodal and monodisperse.

According to a preferred embodiment, a kerolite composition that has previously been prepared from a silicometallic gel of the chemical formula $Si_4Mg_3O_{11},n'H_2O$ by means of an appropriate hydrothermal treatment is used.

In this case, the second preparation process also and advantageously comprises a preliminary step in which a kerolite composition is prepared, which composition will subsequently be subjected to an anhydrous thermal treatment as described above.

Advantageously, said kerolite composition is prepared from a silicometallic gel of the formula $Si_4Mg_3O_{11},n'H_2O$, which has been subjected to a hydrothermal treatment at saturation water vapour pressure and at a temperature of from 100° C. to 240° C. for a period of from one day to several months.

The choice of parameters, especially the temperature and duration, of said hydrothermal treatment permits a certain degree of control of the particle size of the synthetic talc particles that will ultimately be obtained. Depending on the chosen parameters, the synthetic talcose nanoparticles which will ultimately be obtained will have a particle size ranging from 10 nm to 1 μm, with a substantially unimodal and monodisperse particle size distribution.

Advantageously, the silicometallic gel is prepared by coprecipitation as indicated above with reference to the first preparation process, according to the reaction:

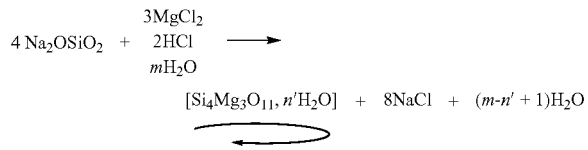

$$4\,Na_2OSiO_2 + \begin{array}{c}3MgCl_2\\2HCl\\mH_2O\end{array} \rightleftarrows [Si_4Mg_3O_{11}, n'H_2O] + 8NaCl + (m-n'+1)H_2O$$

m, n' and (m-n'+1) being positive integers.

Advantageously, the kerolite composition obtained directly from the hydrothermal treatment of said silicometallic gel is dried and then ground in order to obtain a pulverulent composition before it is subjected to said anhydrous thermal treatment. To that end, drying can be carried out by means of an oven; for example at a temperature of the order of 60° C., for at least one to two days. Grinding is advantageously carried out mechanically; for example using a mortar, preferably made of agate in order to avoid any risk of contamination of the kerolite composition.

The structural similarities that exist between synthetic talcose nanoparticles obtained according to this second preparation process and a natural talc have also been demonstrated by X-ray diffraction analysis methods and by infrared absorption.

For example, when analyzed by X-ray diffraction, the difference between synthetic talcose nanoparticles and a natural talc appears especially in the position of the diffraction peak corresponding to the plane (001). For synthetic talcose nanoparticles obtained according to the second preparation process, that diffraction peak is at a distance of between 9.40 Å and 9.68 Å—instead of 9.35 Å for natural talc.

More particularly, synthetic talcose nanoparticles obtained according to the second preparation process are characterized by an X-ray diffraction analysis which yields a diffractogram having the following characteristic diffraction peaks:
- a peak located at 9.40-9.68 Å, corresponding to a plane (001);
- a peak located at 4.50-4.60 Å, corresponding to a plane (020);
- a peak located at 3.10-3.20 Å, corresponding to a plane (003);
- a peak located at 1.50-1.55 Å, corresponding to a plane (060).

Advantageously, the diffraction peak corresponding to the plane (001) is located at a distance of the order of 9.40-9.43 Å.

Advantageously, the second preparation process makes it possible to obtain synthetic talcose nanoparticles which have a particle size below 500 nm, especially from 20 nm to 100 nm. These synthetic talcose nanoparticles additionally have a substantially unimodal and monodisperse particle size distribution.

In a second variant, a composite material according to the invention comprises, as synthetic phyllosilicated nanoparticles, synthetic lamellar phyllosilicated mineral nanoparticles, called swelling TOT-TOT interlayer nanoparticles, formed by interlayering between:
at least one non-swelling mineral phase formed by a stack of elementary laminae of the 2/1 phyllogermanosilicate type and having the chemical formula —$(Si_xGe_{1-x})_4M_3O_{10}(OH)_2$— and at least one swelling mineral phase formed by a stack of elementary laminae of the 2/1 phyllogermanosilicate type and at least one interfoliar space between two consecutive elementary laminae; said swelling mineral phase having the chemical formula —$(Si_xGe_{1-x})_4M_{3-\epsilon}O_{10}(OH)_2, (M^{2+})_{\epsilon'} \cdot nH_2O$—, in which chemical formulae:

M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1,$$

x is a real number of the interval [0; 1], $\epsilon$ and $\epsilon'$ relate to the cation deficit of the elementary laminae of the swelling phase and to the cations present in the interfoliar space(s), respectively, an X-ray diffraction analysis of said swelling TOT-TOT interlayer nanoparticles yielding a diffractogram exhibiting the following characteristic diffraction peaks:
a plane (001) located at a distance of the order of 14-15 Å, representing said swelling mineral phase,
planes representing said non-swelling mineral phase:
- a plane (001) located at a distance of the order of 9.60-10.50 Å;
- a plane (020) located at 4.50-4.60 Å;
- a plane (003) located at 3.10-3.20 Å;
- a plane (060) located at 1.50-1.55 Å.

In the chemical formula representing non-swelling mineral phases and swelling mineral phases, —$(Si_xGe_{1-x})_4M_3O_{10}(OH)_2$— and —$(Si_xGe_{1-x})_4M_{3-\epsilon}O_{10}(OH)_2, (M^{2+})_{\epsilon'} \cdot nH_2O$—, of the swelling TOT-TOT interlayer nanoparticles, Si and Ge refer to the silicon and/or germanium ions that occupy tetrahedral sites of the crystal lattice. M denotes the divalent metal cations of the octahedral sites (for example $Mg^{2+}$, $Co^{2-}$, $Zn^{2+}$, $Cu^{2+}$, $Mn^{2-}$, $Fe^{2+}$, $Ni^{2-}$ and/or $Cr^{2-}$).

The smectites correspond to the most diversified group of the 2/1 argillaceous minerals. In view of their structure, they are described as the swelling TOT (tetrahedron-octahedron-tetrahedron) type.

They are in fact constituted by an irregular stack of elementary laminae of crystalline structure, the number of which varies from several units to several tens of units; each elementary lamina being constituted by the association of two layers of tetrahedrons located on either side of a layer of octahedrons.

The octahedral layer of smectites is formed by two planes of $O^{2-}$ and $OH^-$ ions (in the molar ratio $O^{2-}/OH^-$ of 2:1). On either side of this median layer there are arranged two-dimensional networks of tetrahedrons, of which one of the vertices is occupied by an oxygen of the octahedral layer while the three others are occupied by substantially coplanar oxygens. In natural smectites, the tetrahedral sites are generally occupied by $Si^{4+}$ or $Al^{3+}$ ions, and the octahedral sites are more often occupied by $Mg^{2+}$, $Fe^{2+}$, $Al^{3+}$ and/or $Fe^{3+}$ ions. A small proportion of the octahedral and/or tetrahedral sites is not occupied and is responsible for the cation deficit of the crystal lattice forming the elementary laminae.

Smectites are also characterized by the presence, between the elementary laminae, of interfoliar spaces which contain water and cations and which form the swelling phase of the mineral. In natural smectites, the interfoliar cations are generally $Mg^{2+}$, $Ca^{2+}$ and/or $Na^+$ ions.

Owing to this particular structure, smectites have the feature that they can readily form lamellar complexes with water and with many organic molecules, such as glycerol and ethylene glycol, which insert themselves into the interfoliar space. Likewise, the interfoliar cations are bonded weakly to the remainder of the lattice and are accordingly capable of being exchanged more or less readily with other cations. This is referred to as the cation exchange capacity of the mineral.

The above-mentioned swelling TOT-TOT interlayer nanoparticles are mineral nanoparticles whose structure and cation exchange capacity are similar to those of the natural smectites but whose structural characteristics, such as crystallinity and swelling phase/non-swelling mineral phase ratio, can be foreseeable and/or relatively well defined in the light of the particular parameters applied during their preparation.

The swelling TOT-TOT interlayer nanoparticles are even more hydrophilic than the synthetic silico/germano-metallic nanoparticles, have an even larger accessible surface, promoting the dispersion in the suspension of precursors of the metal matrix during the formation of the composite material as described hereinbelow, and the absorption of the nanoparticles on the metal grains during growth of the metal, without inhibiting the growth of the metal.

Third Preparation Process

Said swellling TOT-TOT interlayer nanoparticles are prepared according to a third preparation process, which is characterized in that a silico/germano-metallic gel having the chemical formula —$(Si_xGe_{1-x})_4M_3O_{11}$,n'$H_2O$—, in the liquid state, is subjected to a hydrothermal treatment; said hydrothermal treatment is carried out for a period of time and at a temperature of from 150° C. to 300° C., which are chosen in dependence on the structural characteristics desired for said swelling TOT-TOT interlayer nanoparticles that are to be prepared; said hydrothermal treatment is carried out at a controlled pressure of the order of 16 bar and with stirring; for a given hydrothermal treatment temperature and time, additional water is added to said silico/germano-silicate gel in order to adjust the water/solid ratio representative of the reaction mixture based on silico/germano-metallic gel that is to be treated, in dependence on the ratio by volume—swelling mineral phase/non-swelling mineral phase—desired for the swelling TOT-TOT interlayer nanoparticles that are to be prepared.

It is to be noted that the publication "synthèse et stabilité des stévensites et talcs, magnésiens et nickelifères, entre 80 et 240° C", A. Decarreau et al. XP008075903, describes a process with which different minerals, stevensites, kerolites and talcs can be obtained, the formation of each mineral being strictly dependent on the temperature. None of the minerals obtained by that process has a diffractogram comprising a diffraction peak for a plane (001) representative of a swelling mineral phase, located at a distance of the order of 14 to 15 angstroms. This document does not describe swelling TOT-TOT interlayer compositions, nor does it describe a process by which such compositions can be obtained.

In the third preparation process, the silico/germano-metallic starting material, which is subjected directly to the hydrothermal treatment, is in the form of a gel, that is to say a highly hydrated substance, having a gelatinous consistency. The gel exhibits thixotropic behaviour and is rendered liquid by simple mechanical stirring. In the third preparation process, the starting silico/germano-metallic gel is advantageously prepared by a coprecipitation reaction as described above with reference to the first preparation process.

In the third preparation process, the supplementary addition of water also makes it possible to prevent calcination of the solid fraction (the starting gel, the final product, any intermediate products). The necessity of adding water in this manner and the minimum amount of water to be added in order to avoid calcination depend substantially on the degree of hydration of the starting gel, on the treatment temperature and on the treatment time. Nevertheless, the water/solid ratio chosen for carrying out the hydrothermal treatment is not unimportant; it affects some of the physicochemical and structural properties of the swelling TOT-TOT interlayer nanoparticles that will ultimately be obtained. In particular, that ratio has a significant effect on the crystallinity of the product and on the swelling mineral phase/non-swelling mineral phase ratio and therefore ultimately especially on the cation exchange capacity of the resulting product as well as on the ability of the product to be loaded with various molecules and substances.

The hydrothermal treatment time, which can range from one day to several days, has a considerable influence especially on the crystallinity of the synthetic mineral that is ultimately obtained.

Advantageously, in the third preparation process, the hydrothermal treatment of said silico/germano-metallic gel is carried out by means of an autoclave. A steel autoclave with an inner lining of polytetrafluoroethylene (Teflon®), titanium or stainless steel is preferably used.

Advantageously, said hydrothermal treatment is carried out at a temperature of the order of 220° C. for a period of time of the order of 15 days. According to a variant of embodiment, said hydrothermal treatment is carried out at a temperature of the order of 300° C. for a period of time of the order of 5 hours.

In order to carry out the hydrothermal treatment with stirring, it is possible, for example, to arrange a bar magnet inside the autoclave.

At the end of the hydrothermal treatment there is obtained a synthetic mineral composition in the form of a colloidal solution containing said swelling TOT-TOT interlayer nanoparticles. The synthetic mineral nanoparticles, in solution in water, can either be in a state in which they are more or less individualized relative to one another or they are organized into more or less coarse aggregates formed of elementary swelling TOT-TOT interlayer nanoparticles which have combined with one another.

Advantageously, a colloidal composition is recovered at the end of the hydrothermal treatment, which colloidal composition can be used as such or, in a variant, can be subjected to a drying step followed by a mechanical grinding step, as indicated above with reference to the first preparation process, to give a solid composition comprising individualized swelling TOT-TOT interlayer nanoparticles.

Compositions Obtained by the Third Preparation Process

Among the swelling TOT-TOT interlayer nanoparticles compositions which can be obtained by this third preparation process and used in a composite material according to the invention there may be mentioned by way of a specific example synthetic talc-stevensite interlayer compositions in which the mineral nanoparticles form an interlayering between:

a stack of talc laminae of the formula —$Si_4Mg_3O_{10}(OH)_2$—, which forms the non-swelling mineral phase, and a stack of laminae of the stevensite type, of the formula —$(Si_4Mg_{3-\epsilon}O_{10}(OH)_2$, $(Mg^{2+})_\epsilon$.n$H_2O$—, which forms the swelling mineral phase.

Likewise, it is possible by means of the third preparation process to obtain compositions of swelling TOT-TOT interlayer nanoparticles analogous in composition to a talc-stevensite interlayer composition, for example so-called "germanium-containing" compositions, in which at least some of the $Si^{4+}$ cations of the tetrahedral sites have been replaced by $Ge^{4+}$ cations. Likewise, they can be so-called "derived" or "functionalized" compositions, for example when the $Mg^{2+}$ cations of the octahedral sites are replaced, in variable proportions, by other divalent cations in order to obtain particles whose physical, especially optical and/or electrical and/or magnetic, properties are improved as compared with natural talc particles.

Analyses carried out especially by X-ray diffraction have enabled the inventors to characterize the mineralogical phases of the resulting swelling TOT-TOT interlayer nanoparticles and confirm that the hydrothermal treatment carried out directly on a silicometallic gel of the chemical formula —$Si_4\,Mg_3O_{11}$, n'$H_2O$— (that is to say a silico/germano-metallic gel of the chemical formula —$(Si_xGe_{1-x})_4M_3O_{11}$, n'$H_2O$—, in which x is equal to 1 and M denotes magnesium) yields a colloidal composition comprising swelling TOT-TOT interlayer nanoparticles of the talc-stevensite type.

Moreover, these analyses have demonstrated the influence of the water/solid ratio representative of the reaction mixture based on silico/germano-metallic gel on the proportion of the swelling phase in the synthetic mineral that is prepared. For a given hydrothermal treatment temperature and time, the more that ratio increases, the more the portion corresponding to the swelling phase diminishes.

Accordingly, advantageously, the synthetic phyllosilicated nanoparticles of a composite material according to the invention are selected from the group formed by:
1) synthetic silico/germano-metallic nanoparticles as defined above, especially synthetic talcose nanoparticles as defined above,
2) swelling TOT-TOT interlayer nanoparticles as defined above.

The invention extends also to a composite material, characterized in that said synthetic phyllosilicated nanoparticles are obtained by a preparation process selected from the first preparation process, the second preparation process and the third preparation process mentioned above.

Advantageously and according to the invention, the composite material comprises a proportion by volume of synthetic phyllosilicated nanoparticles of less than 20% (and greater than 0%).

In a material according to the invention, the synthetic phyllosilicated nanoparticles are distributed in an individualized and dispersed manner within the metal matrix, more particularly within the grains of the metal matrix.

Advantageously and according to the invention, the metal matrix is chosen among: a metal selected from Fe, Co, Ni, Mn, Cr, Cu, W, Mo, Zn, Au, Ag, Pt, Sn, an intermetallic compound including a plurality of the above-mentioned metals, an alloy of a plurality of metals selected from the above-mentioned metals; an alloy including at least one of the above-mentioned metals with a metalloid.

The metal matrix can be composed of a metal selected from the above-mentioned metals, alone, or in the form of an intermetallic compound, or in the form of an alloy of a plurality of metals, or in the form of an alloy with a metalloid. Composite materials in which the matrix is nickel, a metal alloy of nickel with other metals, or an alloy of nickel with a metalloid (for example NiP), are of particular interest.

A coating composed of a composite material according to the invention can be deposited electrolytically on the substrate to be treated.

The process of depositing on a substrate a coating composed of the composite material according to the invention consists in carrying out an electrolytic deposition using a solution of precursors of the metal matrix of the coating. It is characterized in that the solution of precursors further contains synthetic phyllosilicated nanoparticles.

Accordingly, the invention extends to a process for depositing on a substrate a coating composed of a composite material comprising a metal matrix within which there are distributed lamellar phyllosilicated mineral particles, characterized in that it consists in carrying out an electrolytic deposition using a solution of precursors of the metal matrix of the coating, which solution further contains hydrophilic synthetic lamellar silico/germano-metallic mineral nanoparticles, called synthetic phyllosilicated nanoparticles, having an average size of from 10 nm to 1 μm.

In an embodiment, the deposition process is carried out chemically, by bringing the surface of the substrate to be coated into contact with the solution containing the precursors of the metal matrix, the synthetic phyllosilicated nanoparticles, as well as a compound acting as catalyst for the oxidation-reduction of the precursors of the metal matrix of the coating. Advantageously and according to the invention, said catalyst is deposited on the substrate beforehand.

In another embodiment, the deposition process is carried out electrochemically in an electrochemical cell in which said substrate to be coated constitutes the cathode and the electrolyte is a solution of precursors of the metal matrix of the coating, which solution further contains the synthetic phyllosilicated nanoparticles. Advantageously and according to the invention, the anode of the electrochemical cell is constituted by the metal forming the matrix or by an insoluble anode.

In a deposition process according to the invention, advantageously, the precursors of the metal matrix are selected from complexed or non-complexed ionic compounds which are reducible in solution by chemical means or by the supply of electrons. By way of example, there may be mentioned salts such as chlorides, sulfates, sulfamates, as well as complexes such as citrates and acetates.

The solution of precursors further contains one or more compounds which enable the pH to be adjusted to the desired value, as well as the particles of modified talc.

When a coating comprising a nickel matrix is deposited electrochemically, the electrolyte is a solution containing at least one nickel salt selected from nickel sulfate and nickel chloride, a pH-regulating agent and a support electrolyte. A particularly preferred pH regulator is boric acid; at pH 4.5 it forms a complex with the nickel while liberating an $H^+$ and it thus balances the reduction of the $H^+$ ions at the cathode. As an example of a support electrolyte there may be mentioned, for example, sodium sulfate, magnesium sulfate and sodium bromide.

When a coating comprising a nickel-phosphorus matrix is deposited electrochemically, it is possible to use an electrolyte containing at least one nickel salt selected from nickel sulfate and nickel chloride, a pH-regulating agent, a phosphorus precursor, and a support electrolyte. $H_3PO_3$ is advantageously chosen as the phosphorus precursor. The pH regulator can be selected from $H_3PO_4$ and $H_3BO_3$, $H_3PO_4$ being particularly preferred. As an example of a support electrolyte there may be mentioned, for example, sodium sulfate, magnesium sulfate and sodium bromide.

When a coating comprising a zinc-nickel matrix is deposited electrochemically, it is possible to use basic or acidic electrolytes containing at least one nickel salt selected from nickel sulfate and nickel chloride, at least one zinc oxide or a zinc salt such as zinc chloride, a complexing agent of the amine type, and a support electrolyte such as, for example, KCl.

The process is carried out under the conventional conditions for electrochemical depositions. The duration of the electrolysis depends especially on the desired thickness of the coating. The temperature in the electrochemical cell is advantageously from 0° C. to 90° C., and the current density applied to the cell is from 0.1 to 10 A.dm$^{-2}$. An electrochemical cell in which the anode is of the soluble anode type, constituted by the metal to be deposited, is preferably used.

Moreover, in a deposition process according to the invention there is advantageously used a proportion of synthetic phyllosilicated nanoparticles such that the proportion by volume of those synthetic phyllosilicated nanoparticles in the resulting coating is less than 20% (and, of course, greater than 0%).

The substrate can be constituted by an intrinsically conductive material (for example a metal or alloy) used in the solid state or in the form of a coating on any support. The substrate can further be constituted by an insulating or semiconducting material (for example a polymer or ceramic), the surface of which that is to be treated has been rendered conductive by a preliminary metallization step.

The mechanical properties of the composite coatings have been tested by means of a tribometer of the pin-on-disk type in which the pin (which constitutes the antagonistic body) is a 100C6 steel ball having a hardness of 1000 Hv. When a disk constituted solely of nickel is used, the adherence of the nickel to the steel manifests itself in a high coefficient of friction and a considerable wear rate of the steel ball. When the disk used is constituted by a composite material comprising a nickel matrix and the synthetic phyllosilicated nanoparticles according to the invention, the coefficient of friction and the wear rate are greatly reduced.

The invention relates also to a composite material, to a substrate, to a lubricating coating and to a deposition process, characterized in combination by all or some of the features mentioned hereinabove or hereinbelow.

Figure 2:
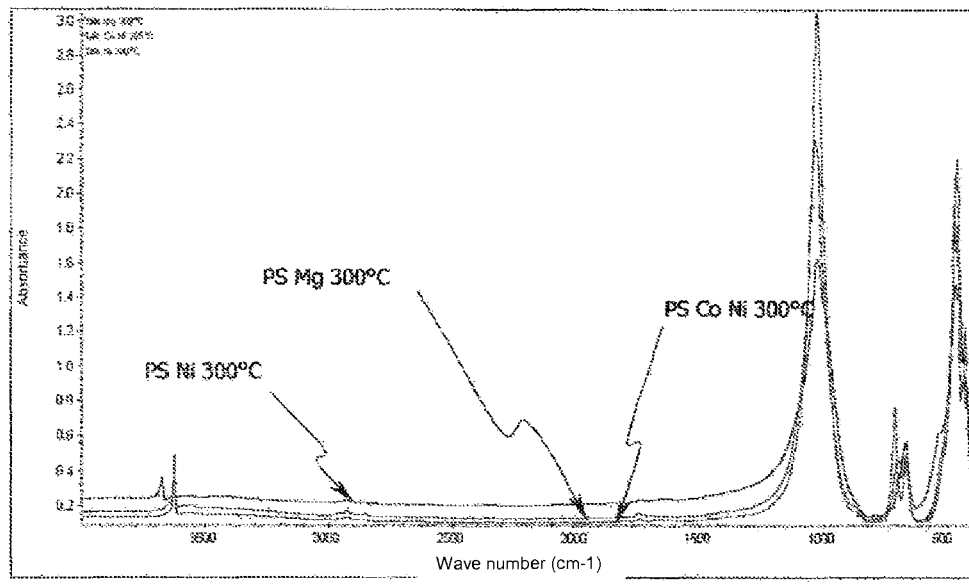
Figure 3:
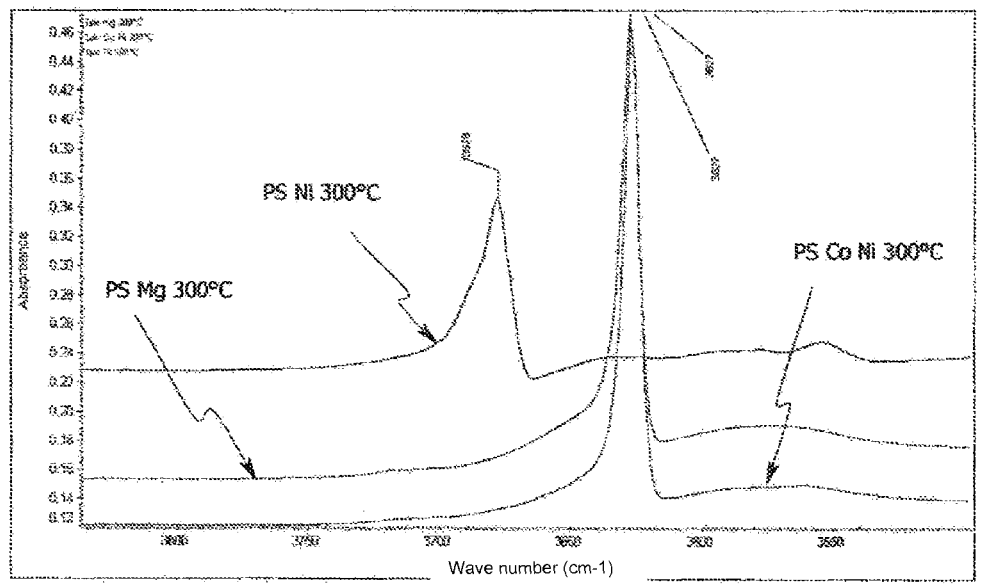
Figure 4:
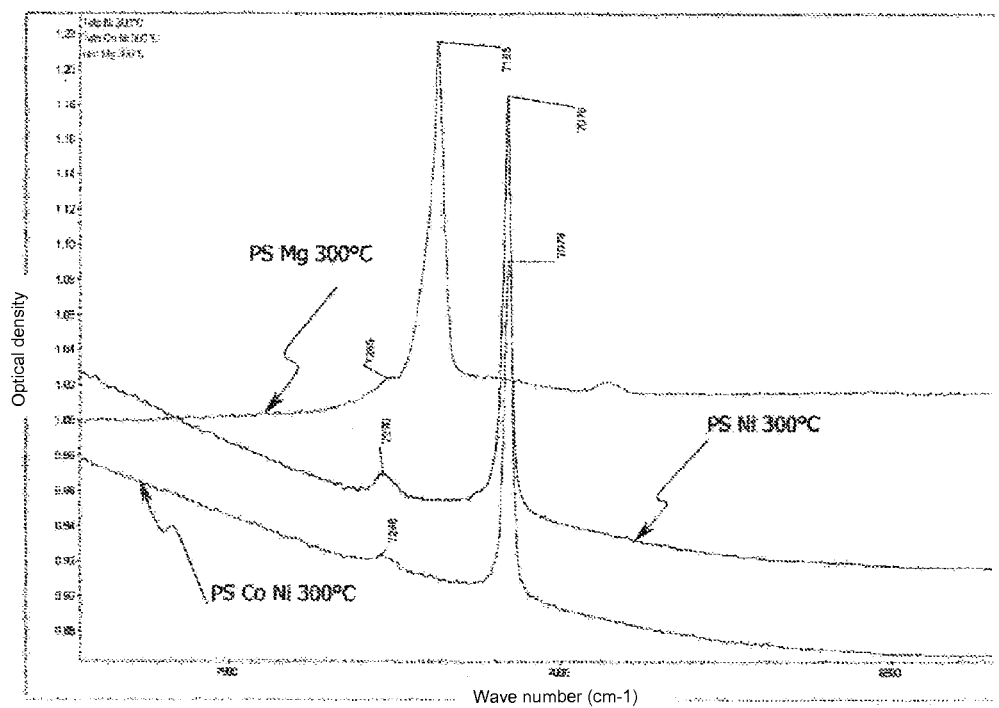
Figure 5:
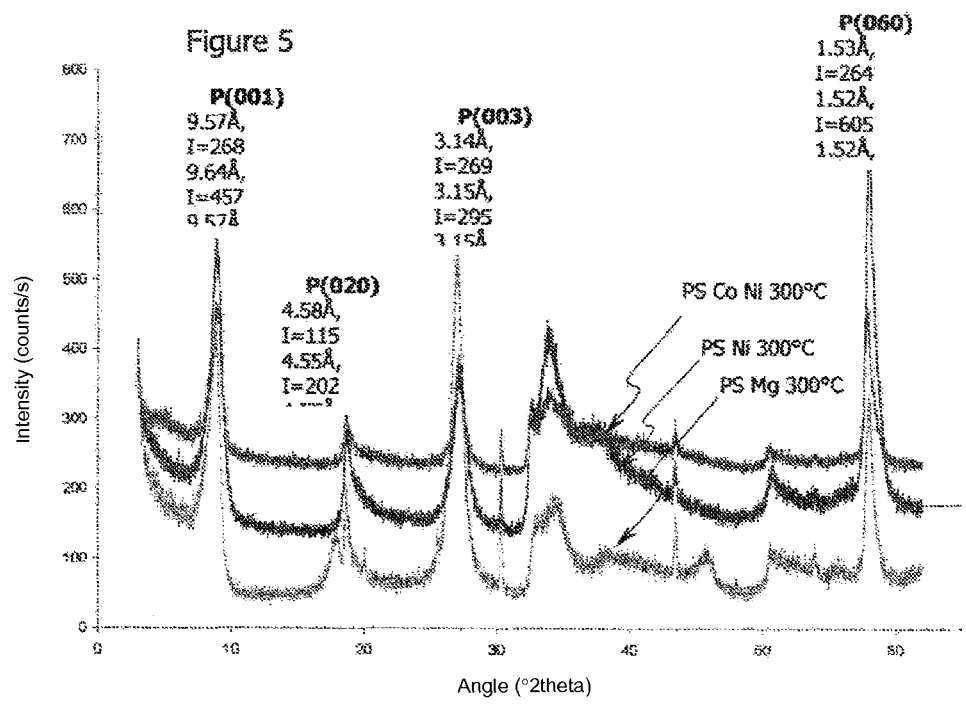
Figure 6:
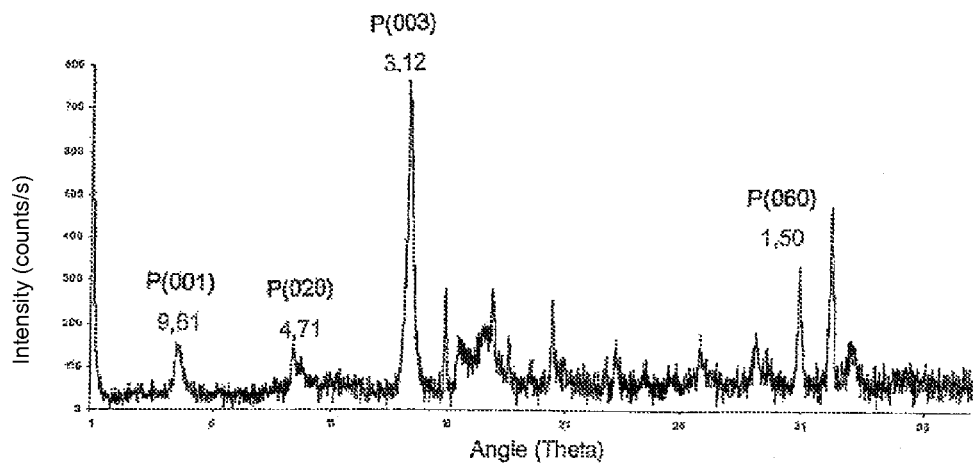
Figure 7A:
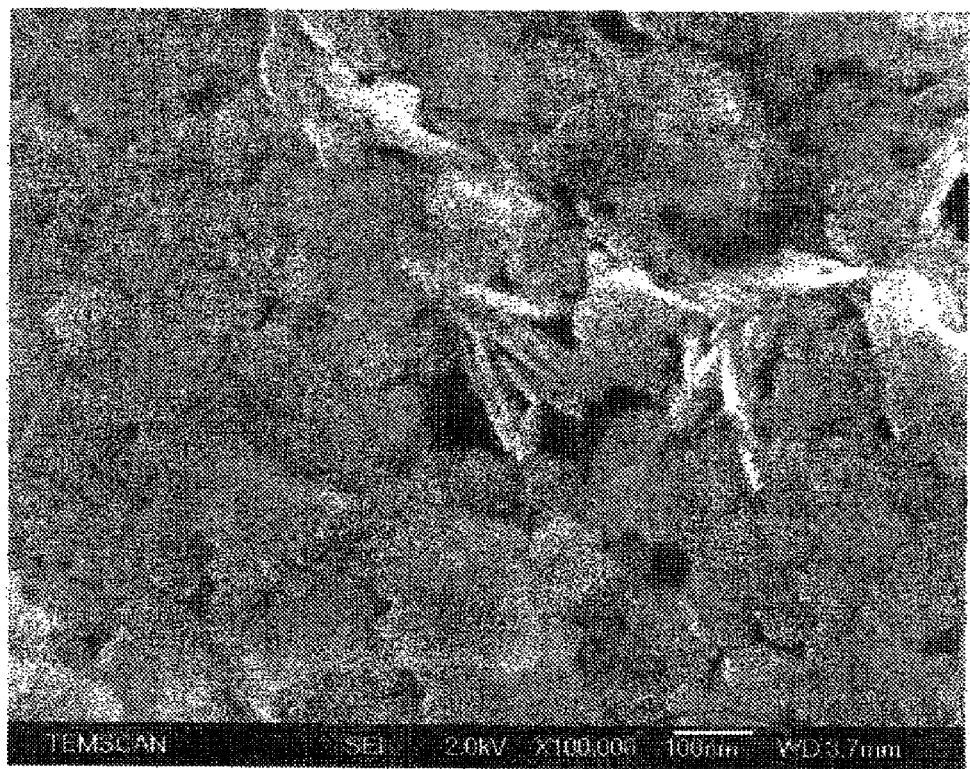
Figure 7B:
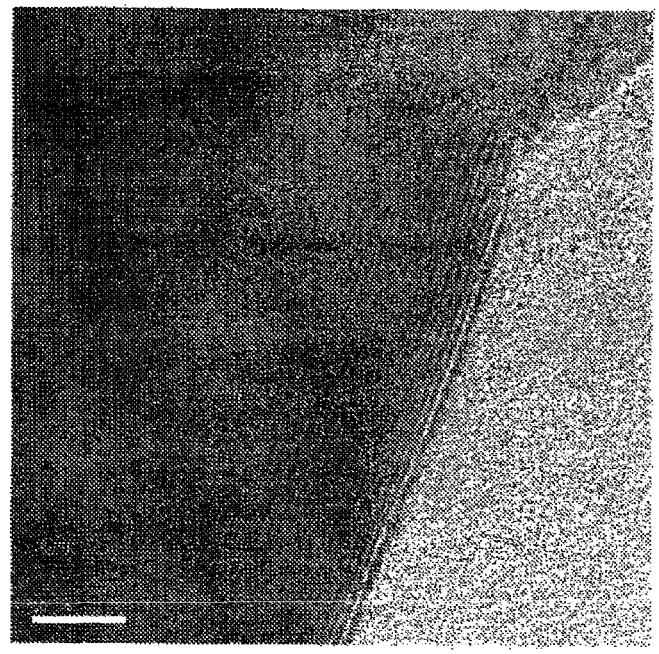
Figure 7C:
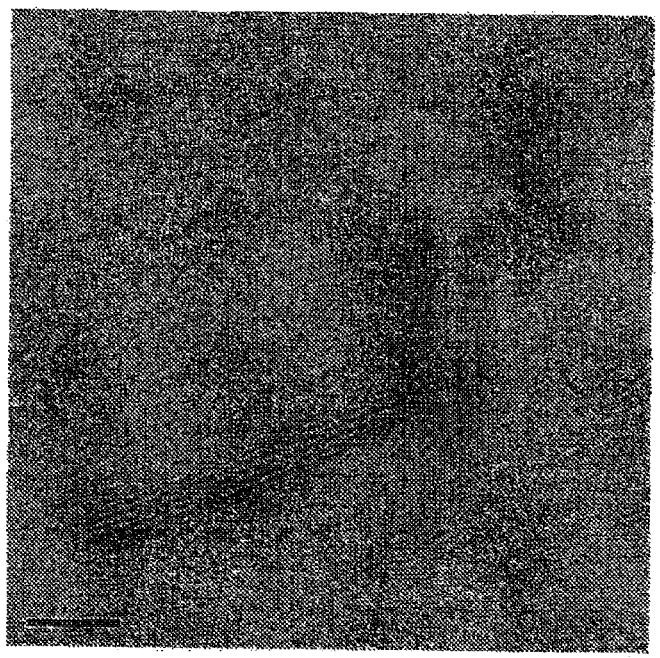
Figure 8:
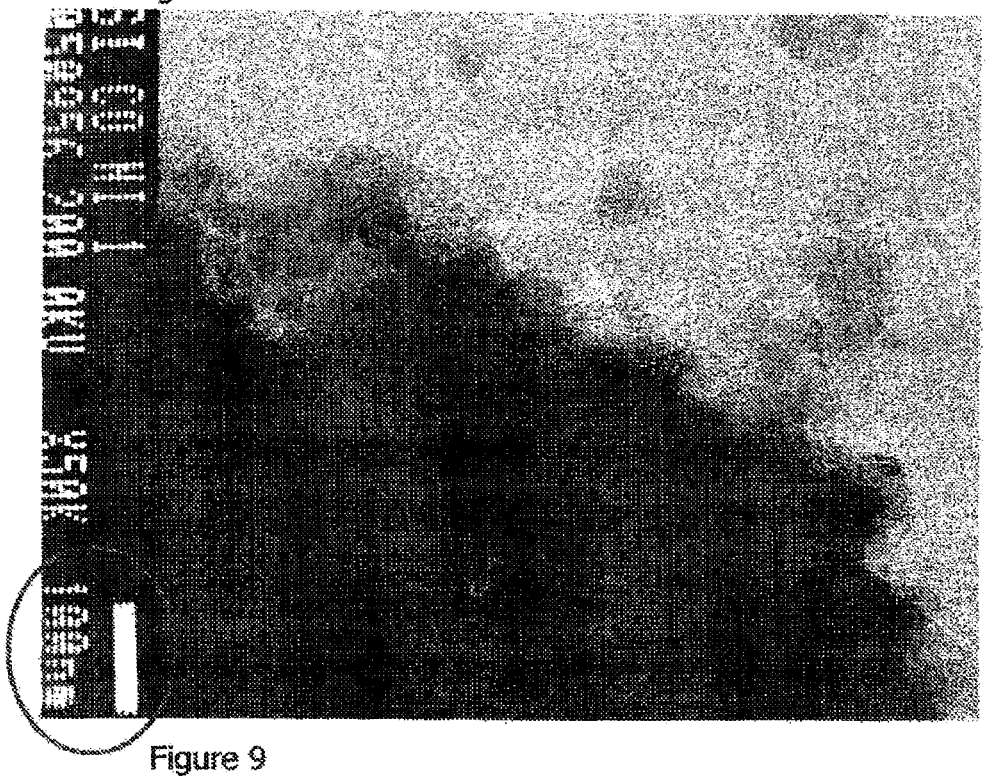
Figure 9:
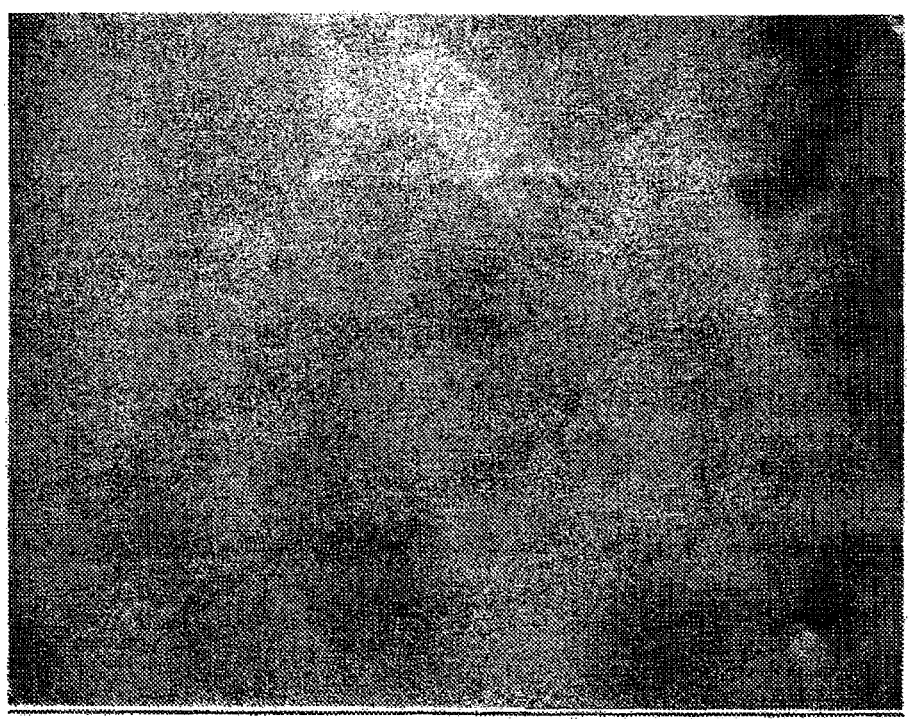
Figure 11B:
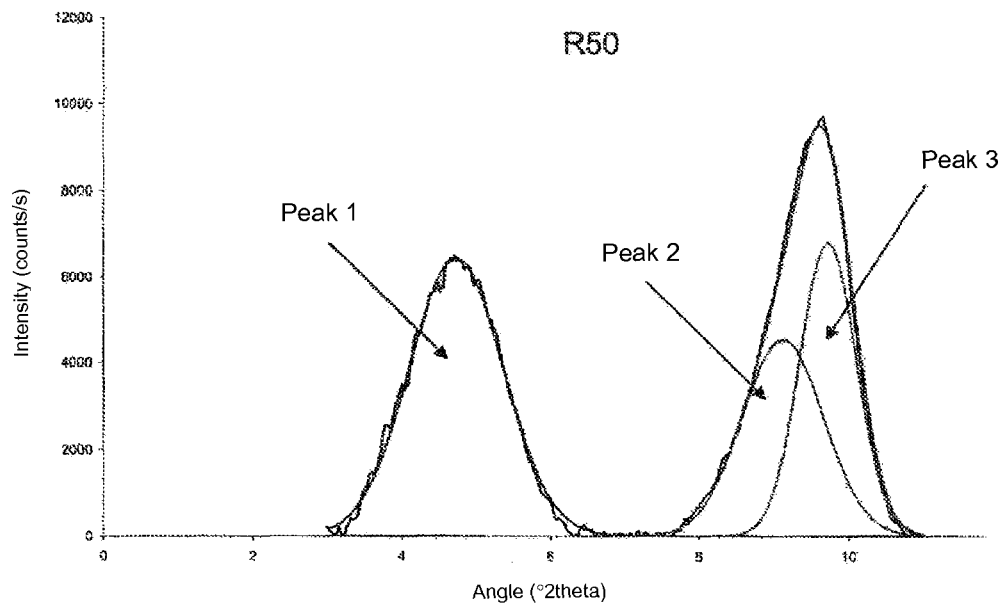
Figure 11C:
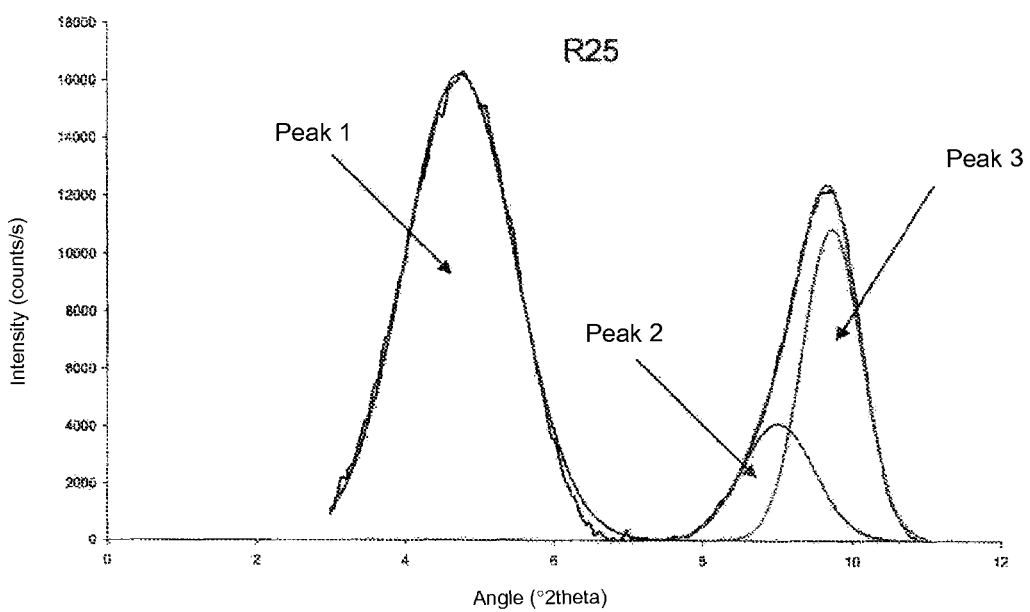
Figure 12:
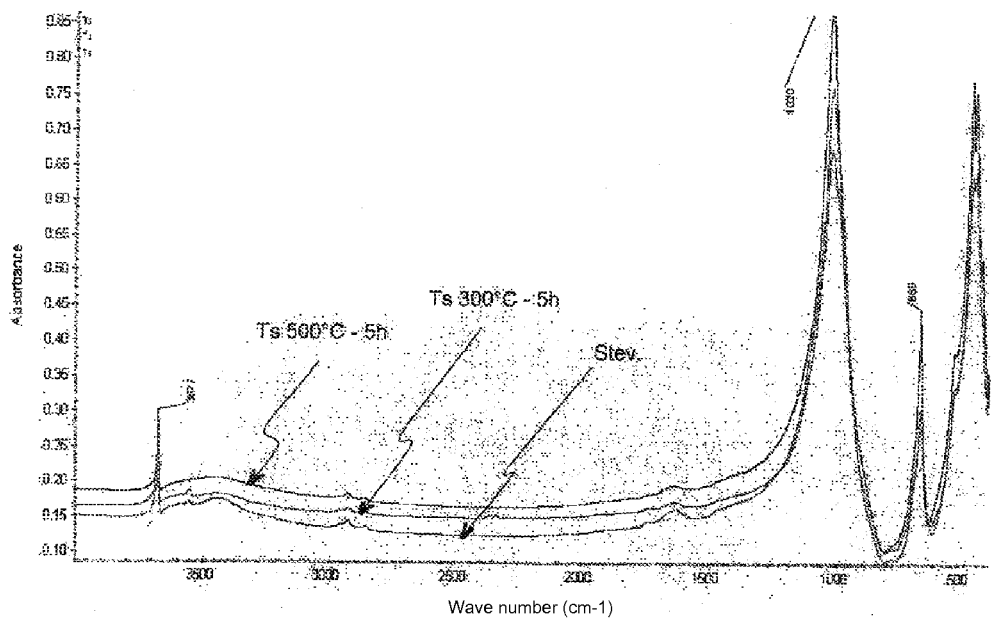
Figure 13A:
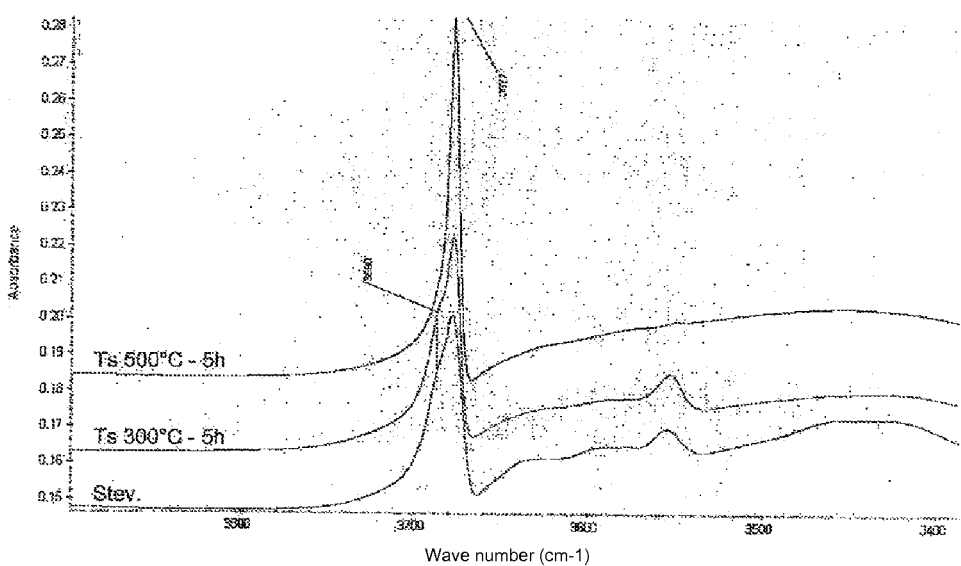
Figure 13B:
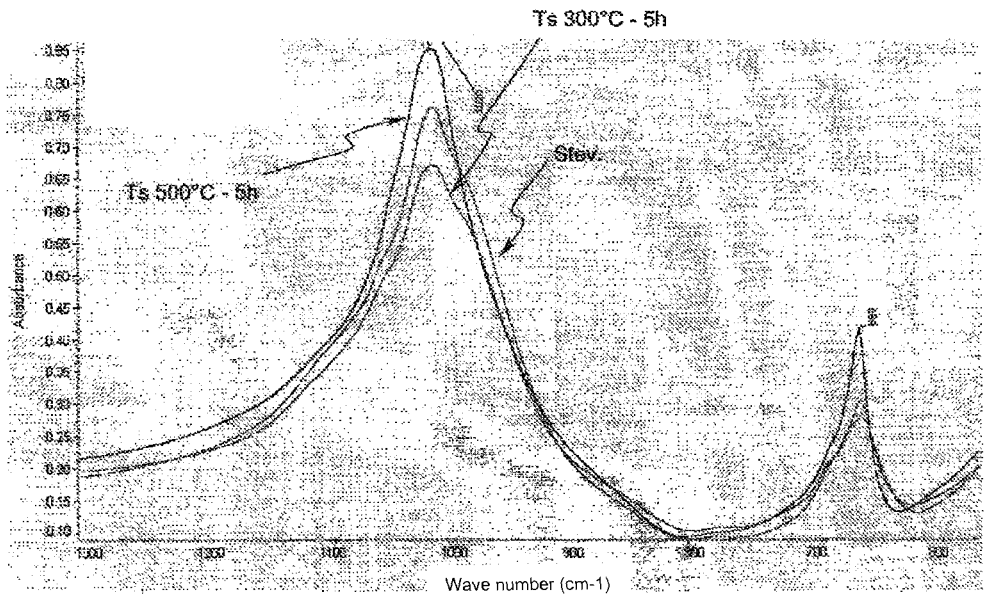
Figure 14:
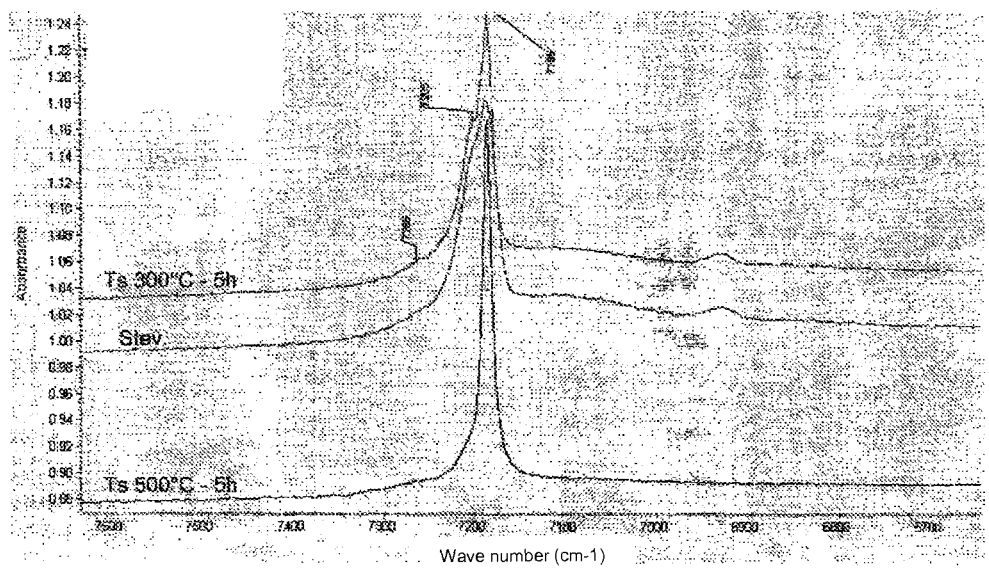
Figure 15:
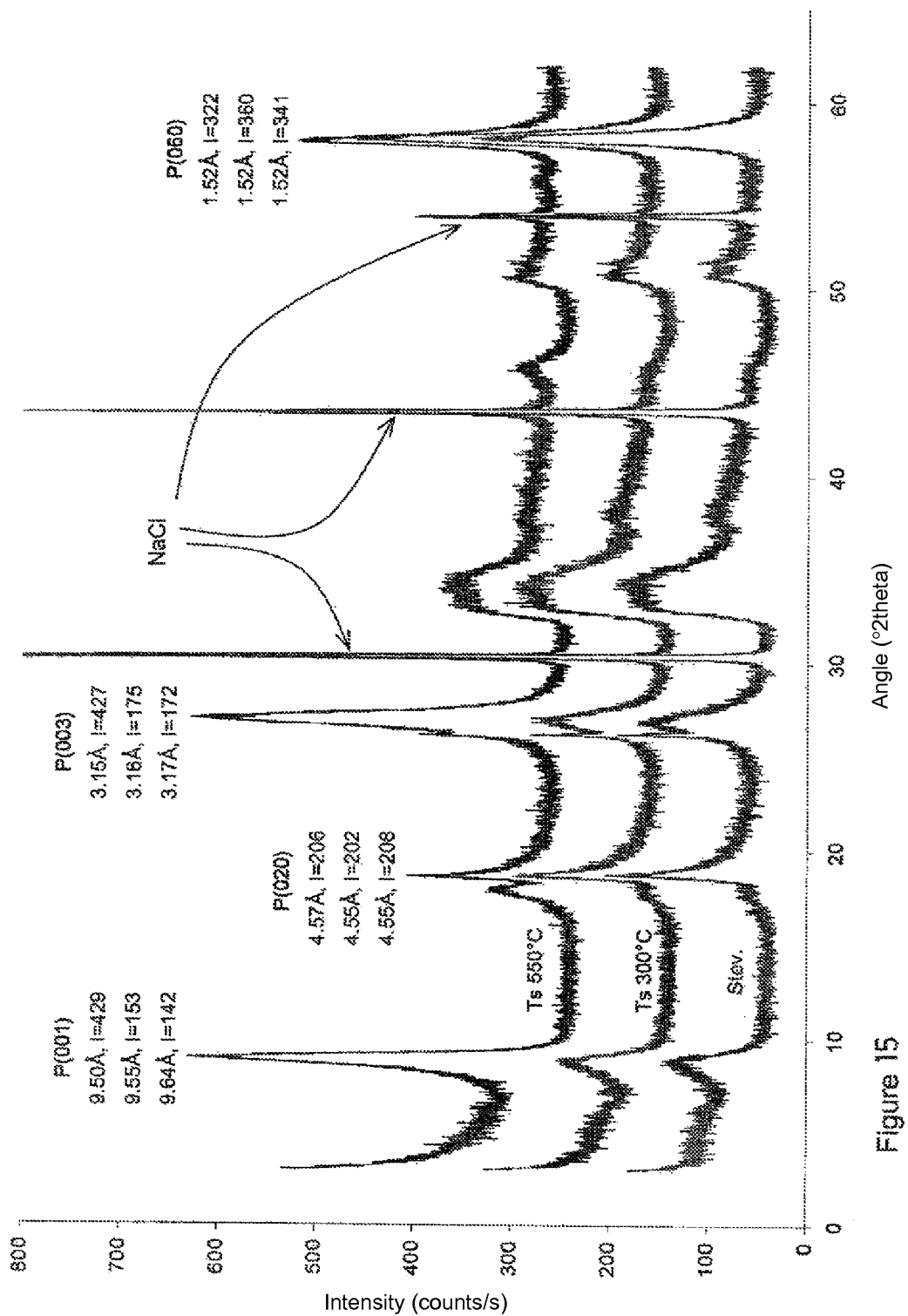
Figure 16:
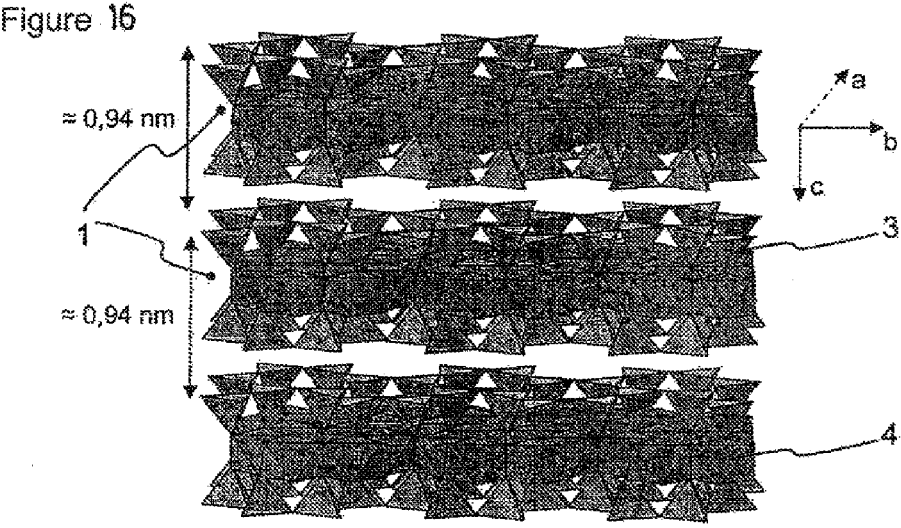
Figure 17:
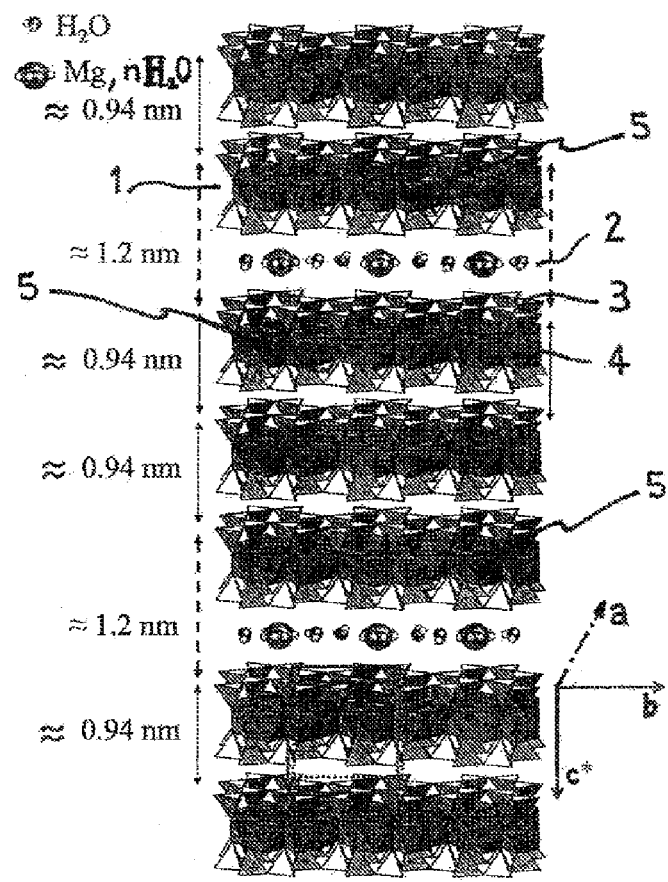
Figure 18:
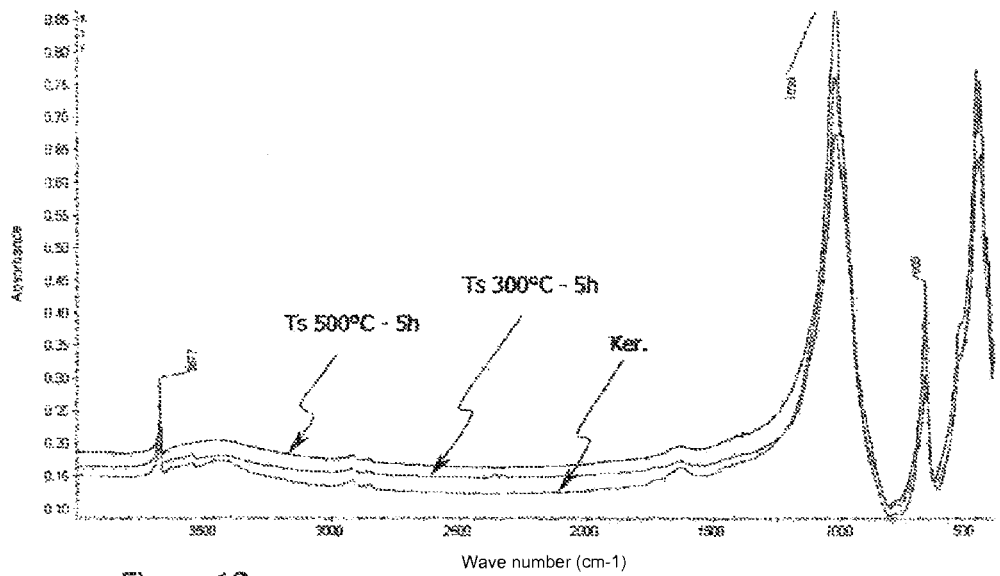
Figure 19A:
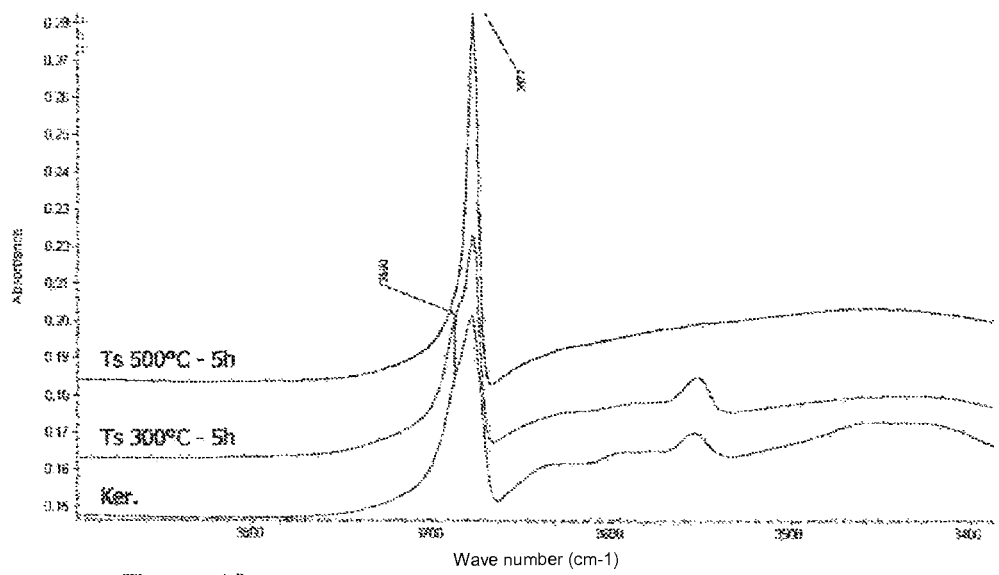
Figure 19B:
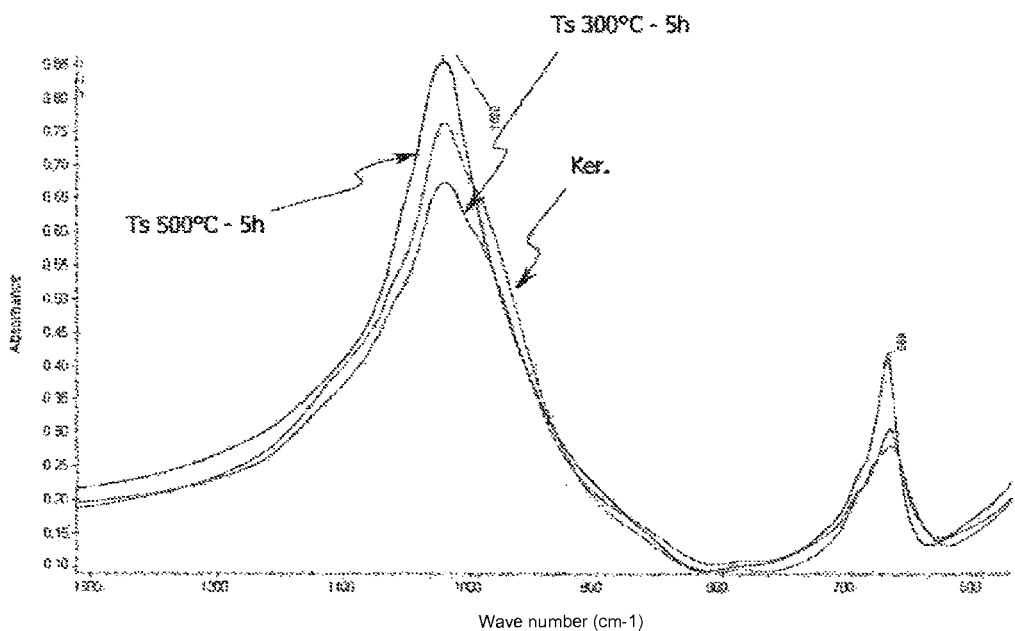
Figure 20:
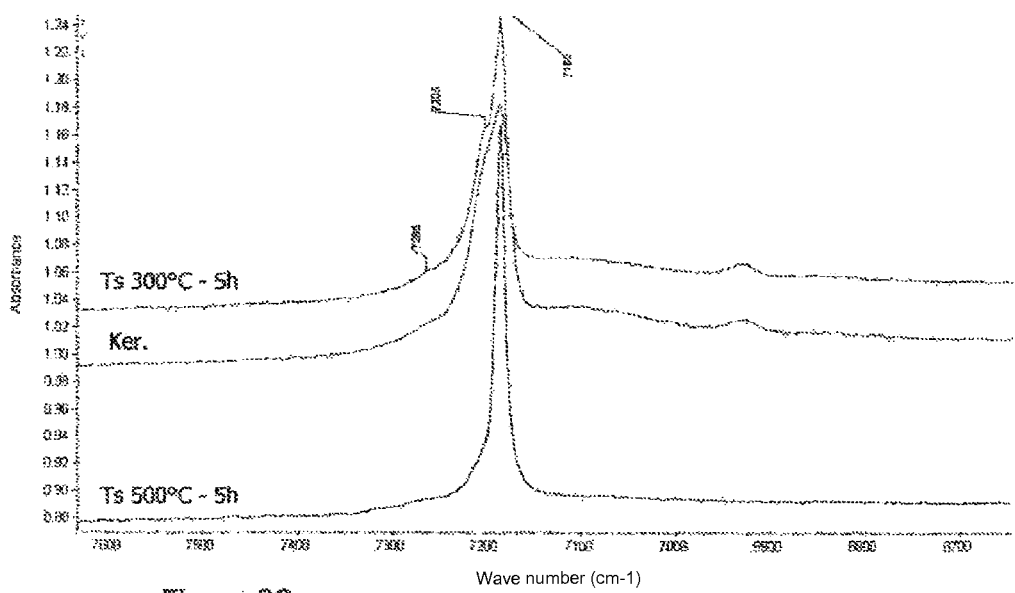
Figure 21:
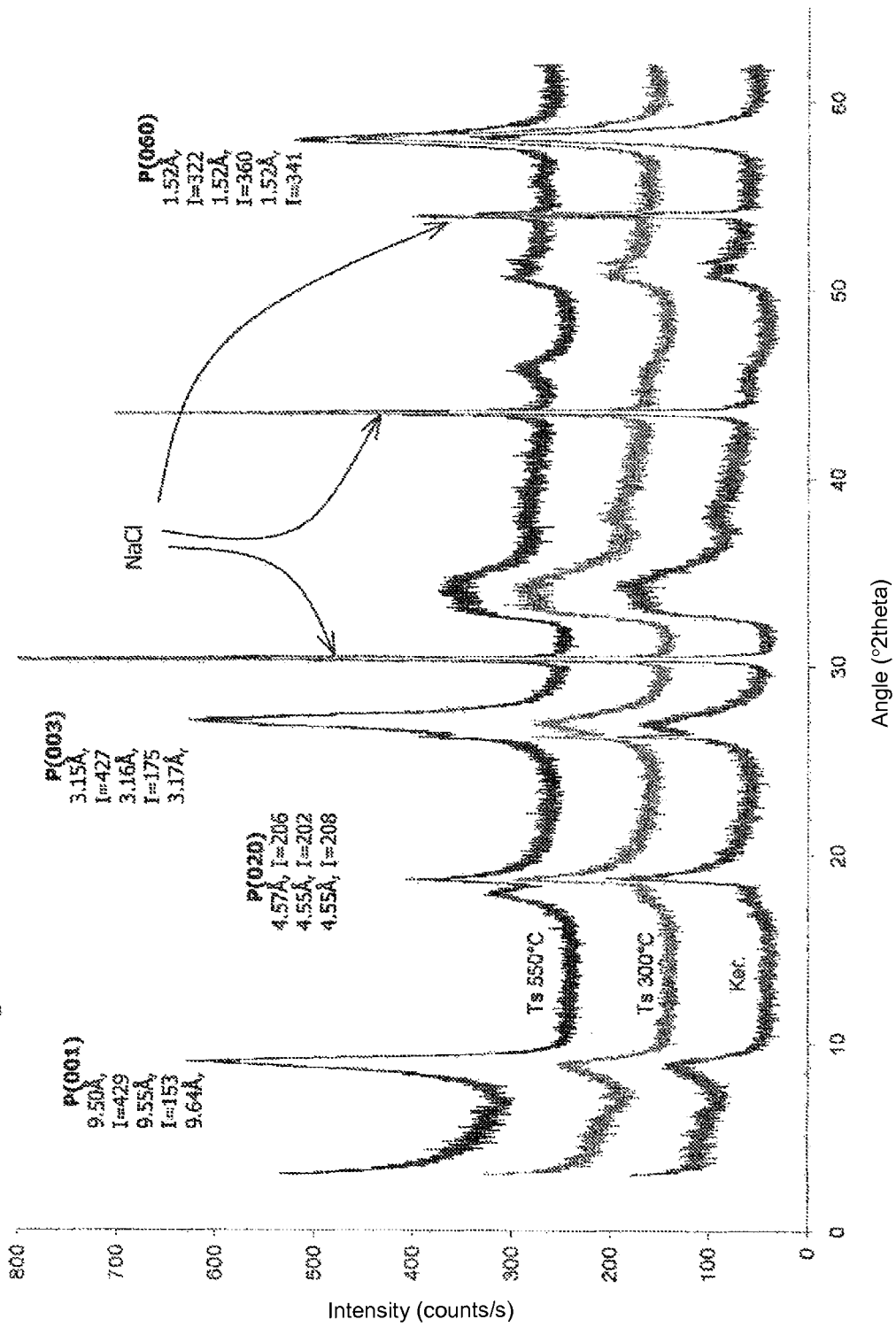
Figure 22:
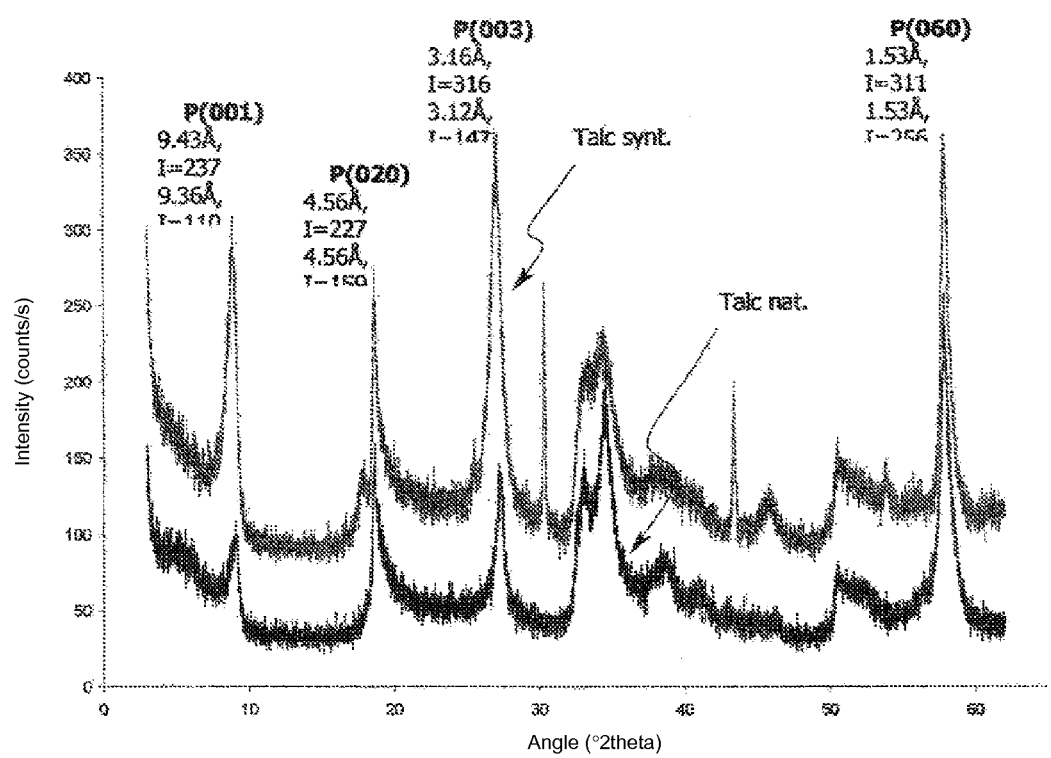
Figure 23:
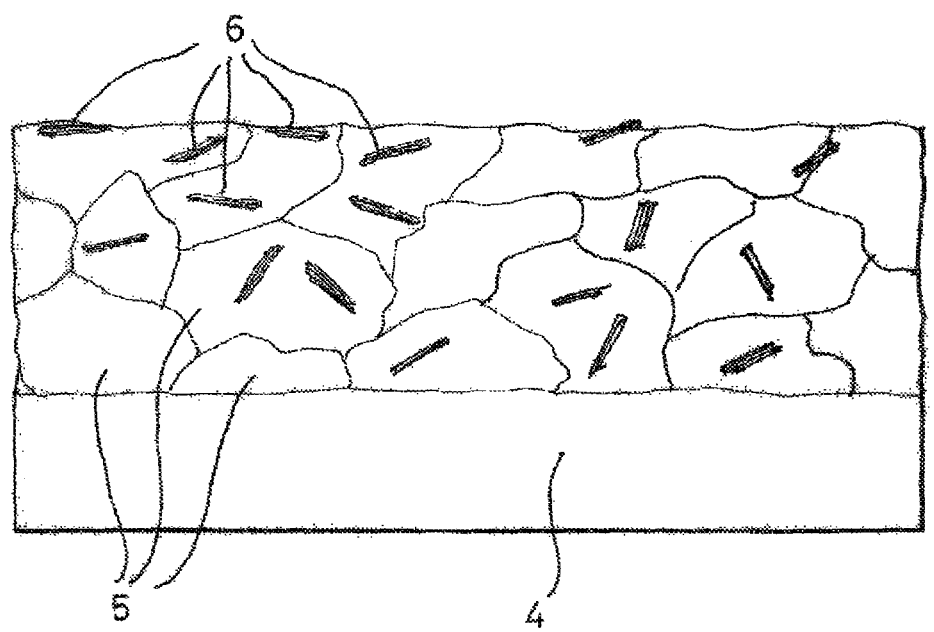

Other objects, advantages peculiar to the invention will become apparent from reading the description and the examples which follow, which are given by way of non-limiting examples and refer to the accompanying figures, in which:

FIG. 1 is a diagram showing a coating formed of a composite material according to the prior art, FIG. 2 shows three absorption spectra recorded in the mid-infrared range, corresponding to three different compositions of synthetic phyllosilicated nanoparticles which can be incorporated into a composite material according to the invention, FIG. 3 corresponds to an enlargement of the preceding spectra, in the region of the zone between 3850 cm$^{-1}$ and 3500 cm$^{-1}$, FIG. 4 shows the zone between 6000 cm$^{-1}$ and 8000 cm$^{-1}$ of three absorption spectra recorded in the near-infrared range, corresponding to the three compositions of FIG. 1, FIGS. 5 and 6 show the RX diffractograms corresponding to the three compositions of FIG. 2 and to a fourth particular composition of synthetic phyllosilicated nanoparticles, FIGS. 7a, 7b and 7c represent scanning electron microscopy micrographs of a composition of synthetic phyllosilicated nanoparticles which can be incorporated into a composite material according to the invention, FIGS. 8 and 9 correspond to transmission electron microscopy micrographs showing the nanometric size and the substantially unimodal and monodisperse distribution of the synthetic phyllosilicated nanoparticles of three specific compositions, FIG. 10 shows the diffractograms corresponding to the X-ray diffraction analysis carried out on four compositions of swelling TOT-TOT interlayer nanoparticles prepared according to the third preparation process with different water/solid ratios, during hydrothermal treatment, FIGS. 11a to 11d correspond to X-ray diffraction analyses carried out on oriented plates saturated with ethylene glycol and calcium, prepared using the preceding four compositions of swelling TOT-TOT interlayer nanoparticles, FIG. 12 shows three absorption spectra recorded in the mid-infrared range, corresponding to three specific compositions of swelling TOT-TOT interlayer nanoparticles, FIGS. 13a and 13b correspond to enlargements of the spectra of FIG. 1, produced in the region of specific zones, FIG. 14 corresponds to absorption spectra recorded in the near-infrared range, showing the conversion of a composition of swelling TOT-TOT interlayer nanoparticles according to the invention into a composition of synthetic talcose nanoparticles by anhydrous thermal treatment, FIG. 15 shows three diffractograms corresponding to the X-ray diffraction analysis of the mineral compositions of FIGS. 12, 13a, 13b and 14 and confirms the observations thereof, FIGS. 16 and 17 are diagrammatic representations which show, respectively, the crystalline organization of synthetic talcose nanoparticles obtained after conversion by anhydrous thermal treatment of swelling TOT-TOT interlayer nanoparticles obtained according to the third preparation process, and the crystalline organization of swelling TOT-TOT interlayer nanoparticles obtained according to the third preparation process, FIG. 18 shows three absorption spectra recorded in the mid-infrared range, corresponding to three mineral compositions of specific synthetic talcose nanoparticles, FIGS. 19a and 19b correspond to enlargements of the spectra of FIG. 18, in the region of specific zones, FIG. 20 shows three absorption spectra recorded in the near-infrared range, corresponding to these three mineral compositions of synthetic talcose nanoparticles, FIG. 21 shows the diffractograms corresponding to the X-ray diffraction analysis carried out on three other mineral compositions of specific synthetic talcose nanoparticles, FIG. 22 shows the comparative diffractograms between a composition of synthetic talcose nanoparticles prepared according to the second preparation process and a sample of natural talc, also of nanometric size, but obtained by intensive mechanical grinding, FIG. 23 is a diagram showing a coating formed of a composite material according to the invention.

FIG. 1 shows a coating formed of a composite material according to WO 2004/063428, comprising modified particles 2 of natural talc incorporated into a metal matrix formed of grains 3, the metal matrix being deposited on a substrate 4. As will be seen, the particles 2 extend substantially in a direction perpendicular to the surface of the substrate 4, and the size of the particles 2 is of the same order of magnitude as the size of the metal grains 3. Consequently, the particles 2 of natural talc are intercalated between the grains, impair the growth of the metal grains during the deposition, and protrude from the free surface of the coating, causing a high degree of roughness thereof following the deposition step. Furthermore, the incorporation of natural talc leads to the incorporation of impurities.

EXAMPLE 1

Preparation of Synthetic Silico/Germano-Metallic (Phyllosilicated) Nanoparticles According to the First Preparation Process A/—General Protocol of a First Process for the Preparation of a Composition of Synthetic Silico/Germano-Metallic Nanoparticles:

1/—Preparation of a Silico/Germano-Metallic Gel

A silico/germano-metallic gel is prepared by a coprecipitation according to the following reaction equation:

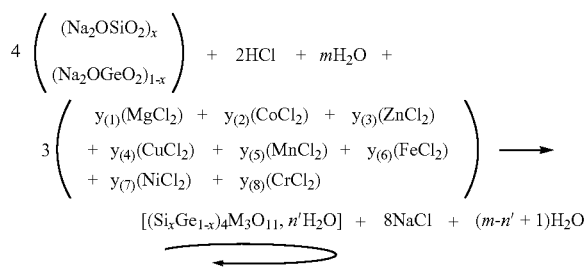

By means of this coprecipitation reaction it is possible to obtain a hydrated silico/germano-metallic gel having the stoichiometry of a natural talc (4 Si/Ge to 3 M). It is carried out starting from:

1. an aqueous solution of penta-hydrated sodium metasilicate or an aqueous solution of sodium metagermanate, or a mixture of these two solutions in the molar ratio x:(1-x),
2. a metal chloride solution prepared with one or more metal salts (in the form of hygroscopic crystals) diluted in distilled water, and
3. a 1N hydrochloric acid solution.

The silico/germano-metallic gel is prepared according to the following protocol:

1. the hydrochloric acid solution and the metal chloride solution are mixed,
2. that mixture is added to the solution of sodium metasilicate and/or metagermanate; the coprecipitation gel forms instantly,
3. the gel is recovered after centrifugation (at not less than 3000 to 7000 revolutions/minute for 15 minutes) and removal of the supernatant (sodium chloride solution that has formed),
4. the gel is washed with distilled or osmozed water or with tap water (a minimum of two washing/centrifugation cycles are necessary).

At the end of this first phase, a highly hydrated silico/germano-metallic gel $(Si_xGe_{1-x})_4M_3O_{11}, n'H_2O$ of gelatinous consistency is obtained. The gel has thixotropic behaviour, that is to say it changes from a viscous state to a liquid state when it is stirred and then returns to its initial state after a certain rest period.

2/—Hydrothermal Treatment of the Silico/Germano-Metallic Gel

The silico/germano-metallic gel as obtained hereinbefore is subjected to a hydrothermal treatment at a temperature of from 300° C. to 500° C.

To that end:

1. the gel, in liquefied form, is placed in a reactor/autoclave; the liquid/solid ratio is optionally adjusted to a value of the order of 0.83 (the amount of liquid being expressed in $cm^3$ and the amount of solid in grams),
2. the reactor/autoclave is placed inside an oven, at the reaction temperature (set at from 300° C. to 500° C.) throughout the treatment period.

The inventors found that the particle size of the particles depended on the temperature of the hydrothermal treatment. The lower the temperature, the smaller the synthesized particles (of the order of 10 nanometres at 300° C. to 1 μm at a temperature of the order of 500° C.).

Likewise, the inventors noted that the crystallinity and the thermal stability of the synthesized particles depended substantially on the duration of the treatment. The duration of the hydrothermal treatment must be sufficient to permit conversion of the initial gelatinous mass into a crystallized and thermally stable solid material.

During the hydrothermal treatment, the silico/germano-metallic gel gradually loses its gelatinous consistency and acquires a particulate crystalline structure, the crystallinity of which increases with time. This gradual crystallization of the material can be detected by X-ray diffraction analysis and manifests itself in the corresponding diffractograms by the appearance of characteristic peaks which become sharper and intensify throughout the treatment.

At the end of the hydrothermal treatment there is obtained a colloidal synthetic composition comprising pure crystalline synthetic lamellar phyllosilicated (silico/germano-metallic) nanoparticles in suspension in water. At the end of the hydrothermal treatment, the resulting colloidal composition can be used directly or, in a variant, a subsequent treatment can be carried out, especially:

3. the contents of the reactor are filtered in order to recover the solid phase therefrom,
4. the solid composition is dried in an oven at 60° C. for one day,
5. once dry, the solid composition is ground in an agate mortar.

There is ultimately obtained a divided solid composition, the colour of which is dependent on the nature of the metal chloride(s) used in the preparation of the silico/germano-metallic gel (and also, where appropriate, on the respective proportions of the metal chlorides).

B/—Structural Analysis and Characterization of Resulting Nanoparticles:

The analysis results of various synthetic compositions obtained by following the protocol described above are recorded below. These results confirm not only that the first preparation process makes it possible effectively to obtain the formation of mineral lamellar synthetic silico/germano-metallic (phyllosilicated) nanoparticles that have structural characteristics (especially lamellarity and crystallinity) very similar to those of natural talcs. They also show that, especially by the choice of temperature and of the duration of the embodiment, the first preparation process permits the synthesis, in an extremely simple manner, of stable and pure synthetic lamellar phyllosilicated (silico/germano-metallic) mineral nanoparticles whose size and crystalline characteristics are defined and foreseeable and which can therefore in particular be adapted for inclusion in the composition of a composite material according to the invention capable of forming a lubricating coating.

The analyses were carried out especially by transmission infrared spectroscopy, by X-ray diffraction and by observations using an electron microscope. The collected data are presented in the accompanying FIGS. 2 to 8 and are discussed hereinbelow.

1/—Infrared Analysis

It is known that, in infrared, by way of reference, the characteristic vibration bands of a natural talc are as follows (with a resolution of 4 cm$^{-1}$):

3678 cm$^{-1}$: Mg$_3$—OH bond vibration;
1018 cm$^{-1}$: Si—O—Si bond vibration;
669 cm$^{-1}$: Mg—O—Si bond vibration;
7185 cm$^{-1}$: Mg$_3$—OH bond vibration.

FIGS. 2 to 4 show the results of analyses carried out in the mid-infrared range and in the near-infrared range, respectively, on the following three synthetic compositions:

a composition of synthetic silico/germano-metallic nanoparticles of the formula Si$_4$Mg$_3$O$_{10}$(OH)$_2$, prepared according to the first preparation process (with Mg$^{2+}$ as the octahedral cation), with hydrothermal treatment at 300° C. for 3 days (in the figures, this composition is denoted: PS Mg 300° C.), a composition of synthetic silico/germano-metallic nanoparticles of the formula Si$_4$Ni$_3$O$_{10}$(OH)$_2$, prepared according to the first preparation process (with Ni$^{2+}$ as the octahedral cation), with hydrothermal treatment at 300° C. for 3 days (in the figures, this composition is denoted: PS Ni 300° C.), a composition of synthetic silico/germano-metallic nanoparticles of the formula Si$_4$(Co$_{0.5}$Ni$_{0.5}$)$_3$O$_{10}$(OH)$_2$, prepared according to the first preparation process (wit Co$^{2+}$ Ni$^{2+}$ in equimolar proportions as the octahedral cations), with hydrothermal treatment at 300° C. for 3 days (in the figures, this composition is denoted: PS Co Ni 300° C.).

The infrared spectra were recorded using a Nicolet 510-FTIR spectrometer over a range of 4000 to 400 cm$^{-1}$.

The spectrum obtained in the mid-infrared range (FIGS. 1 and 2) shows that the synthetic composition—PS Mg 300° C.—is a mineral composition which is structurally very similar to a natural talc. In particular, this manifests itself in the presence of the peaks representing the bond vibrations Mg$_3$—OH (3678 cm$^{-1}$), Si—O—Si (1018 cm$^{-1}$) and Mg—O—Si (669 cm$^{-1}$).

The results obtained from the measurements carried out in diffuse reflection in the near-infrared range, of which FIG. 4 shows an enlargement of the zone between 8000 cm$^{-1}$ and 6000 cm$^{-1}$, also reveal the presence of a particularly pronounced peak at 7185 cm$^{-1}$. This peak located at 7185 cm$^{-1}$ is also one of the four reference peaks of natural talcs.

The peak at 7265 cm$^{-1}$, located close to that reference peak, reflects a slight hydration of the synthetic silico/germano-metallic nanoparticles.

With regard to the other two synthetic compositions which are also given as examples (PS Ni 300° C./PS Co Ni 300° C.), their infrared absorption spectra show numerous similarities with that of the synthetic composition PS Mg 300° C., starting with the presence of four peaks which overlap with or are immediately adjacent to the four reference peaks of a natural talc.

These similarities in the infrared spectra reflect a high degree of structural similarity between the synthetic lamellar phyllosilicated (silico/germano-metallic) mineral nanoparticles of the synthetic compositions obtained according to the first preparation process and a natural talc. Any shifts which may be observed for certain peaks (for example in the region of the zone between 7300 cm$^{-1}$ and 7000 cm$^{-1}$) are essentially the result of the difference in size between the octahedral cations of the crystal lattice.

2/—X-Ray Diffraction Analyses

In X-ray diffraction, natural talc is known to exhibit four characteristic diffraction peaks:

for the plane (001), a peak located at a distance of 9.35 Å;
for the plane (020), a peak located at 4.55 Å;
for the plane (003), a peak located at 3.14 Å;
for the plane (060), a peak located at 1.52 Å.

The RX diffractograms were recorded on an XPERT-MPD device (PanAnalytical).

The 2θ measurement step is 0.01° with an accumulation time of 2 sec/step. The acceleration voltage is 40 kV and the intensity is 55 mA. The Bragg equation giving the structural equidistance is: $d_{hkl}=0.7703/\sin\theta$.

FIG. 5 shows the results of analyses carried out on the same three compositions as mentioned above:

Si$_4$Mg$_3$O$_{10}$(OH)$_2$, denoted: PS Mg 300° C.
Si$_4$Ni$_3$O$_{10}$(OH)$_2$, denoted: PS Ni 300° C.,
Si$_4$(Co$_{0.5}$Ni$_{0.5}$)$_3$O$_{10}$(OH)$_2$, denoted: PS Co Ni 300° C.

Likewise, FIG. 6 shows an RX diffractogram of a composition of nanoparticles of the formula Ge$_4$Fe$_3$O$_{10}$(OH)$_2$ prepared according to the first preparation process.

These analyses confirm the observations made by infrared spectroscopy. There is a high degree of structural similarity between the lamellar synthetic silico/germano-metallic nanoparticles obtained as indicated above and particles of natural talc.

In particular, the diffraction peaks which correspond to the planes (020), (003) and (060) have positions which coincide perfectly with those of the reference diffraction peaks for natural talc.

Only the position of the diffraction peaks of the plane (001) differs slightly from the position of the reference peak (9.57-9.64 Å, instead of 9.35 Å). This difference in values is explained essentially by:

a nanometric particle size of the lamellar synthetic silico/germano-metallic nanoparticles, contrary to that of natural talcs, a very slight residual hydration of the lamellar synthetic silico/germano-metallic nanoparticles, and optionally, the nature of the octahedral cations of the crystal lattice.

However, it must be noted that the difference resulting from the residual hydration diminishes with longer reaction times and more forced drying.

Finally, the width at half maximum of the peaks of planes (001), (020), (003) and (060) is evidence of the good crystallinity of the lamellar synthetic silico/germano-metallic nanoparticles.

In addition, the resulting synthetic silico/germano-metallic nanoparticles differ from a natural talc in that they are hydrophilic, which is noted visually by simply bringing the nanoparticles into contact with water.

It will be noted that, for the RX diffractogram representing the Ge$_4$Fe$_3$O$_{10}$(OH)$_2$ nanoparticles (FIG. 6), the strong intensity of the diffraction peak corresponding to the plane (003) is due in part to contamination by germanium oxide.

3/—Microscopic Observations and Assessment of the Particle Size of the Lamellar Synthetic Silico/Germano-Metallic Nanoparticles:

Given the high degree of fineness of the powders which can constitute the synthetic compositions so obtained, the size and particle size distribution of the lamellar synthetic silico/germano-metallic (phyllosilicated) nanoparticles composing them were assessed by observation by scanning and field effect electron microscopy and by transmission electron microscopy. The micrographs presented in FIGS. 7a, 7b, 7c, 8 and 9 were taken during some of these observations.

FIGS. 7a, 7b and 7c relate to the observation of a composition of synthetic silico/germano-metallic (phyllosilicated) nanoparticles, which can be described as synthetic talcose nanoparticles, prepared with hydrothermal treatment at 300° C. for a period of 3 days, of the formula $Si_4Mg_3O_{10}(OH)_2$.

FIG. 8 relates to the observation of a composition of synthetic silicometallic nanoparticles prepared with hydrothermal treatment at 300° C., for a period of 3 days, of the formula $Si_4Ni_3O_{10}(OH)_2$.

It is noted that the nanoparticles are perfectly lamellar, pure, and that the particle size of the elementary nanoparticles varies from 20 nm to 100 nm.

Because of the density of the nanoparticles, the images of FIGS. 7a and 8 give the misleading impression that the nanoparticles are mutually agglomerated. In reality, the elementary nanoparticles are in an individualized state. A certain degree of residual humidity might explain the occurrence of a certain cohesion between the nanoparticles.

FIG. 9 relates to the observation of a composition of synthetic silicometallic nanoparticles of the formula $Si_4Mg_3O_{10}(OH)_2$, obtained after hydrothermal treatment at 400° C. for a period of 30 days.

Observation of the corresponding micrograph shows that the synthetic lamellar phyllosilicated (silico/germano-metallic) nanoparticles have an average size of the order of one micrometre.

EXAMPLE 2

Preparation of Swelling TOT-TOT Interlayer Nanoparticles According to the Third Preparation Process, and then of Synthetic Talcose Nanoparticles from the Swelling TOT-TOT Interlayer Nanoparticles A/—General Protocol for the Synthesis of a Swelling TOT-TOT Interlayer Composition According to the Third Preparation Process:
1/—Preparation of a Silico/Germano-Metallic Gel The silico/germano-metallic gel is prepared by coprecipitation as mentioned above in Example 1.
2/—Hydrothermal Treatment of the Silico/Germano-Metallic Gel The silico/germano-metallic gel as obtained hereinbefore is subjected to a hydrothermal treatment at a temperature of from 150° C. to 300° C.

To that end:
1. the gel, in liquefied form, is placed in a reactor (40 ml); the water/solid ratio is optionally adjusted, especially in order to avoid calcination of the solid fraction; in order to avoid any problem of leakage from the reactor, it is filled to ⅔ of its volume,
2. the reactor is placed inside an oven, at the reaction temperature (set at from 150° C. to 300° C.) throughout the treatment.

During the hydrothermal treatment, the silico/germano-metallic gel gradually loses its initial consistency and becomes a particulate solid composition, the crystallinity of which increases with time. This gradual crystallization of the material can be detected by X-ray diffraction analysis and manifests itself in the corresponding diffractograms by the appearance of characteristic peaks which become sharper and intensify throughout the treatment.

At the end of the hydrothermal treatment there is obtained a colloidal composition comprising swelling TOT-TOT interlayer nanoparticles in solution in water. At the end of the hydrothermal treatment, the resulting colloidal composition can be used directly or, in a variant, the following post-treatment can be carried out:
3. the contents of the reactor are filtered in order to recover the solid filtrate therefrom,
4. the filtrate is dried in an oven at 60° C. for one day,
5. once dry, the filtrate is ground in an agate mortar.

There is ultimately obtained a divided solid composition, the colour of which is dependent on the nature of the metal chloride(s) used in the preparation of the silico/germano-metallic gel (and also, where appropriate, on the respective proportions of the metal chlorides).

For example, the swelling TOT-TOT interlayer nanoparticles of type:
$Si_4Mg_3O_{10}(OH)_2/Si_4Mg_{3-\epsilon}O^{10}(OH)_2$, $(Mg^{2+})_\epsilon{\cdot}nH_2O$ are white in colour,
$Si_4Ni_3O_{10}(OH)_2/Si_4Ni_{3-\epsilon}O_{10}(OH)_2$, $(Ni^{2+})_\epsilon{\cdot}nH_2O$ are green in colour,
$Si_4Co_3O_{10}(OH)_2/Si_4Co_{3-\epsilon}O_{10}(OH)_2$, $(Co^{2+})_\epsilon{\cdot}nH_2O$ are pink in colour,
$Si_4Cu_3O_{10}(OH)_2/Si_4Cu_{3-\epsilon}O_{10}(OH)_2$, $(Cu^{2+})_\epsilon{\cdot}nH_2O$ are blue in colour,
$Si_4Mn_3O_{10}(OH)_2/Si_4Mn_{3-\epsilon}O_{10}(OH)_2$, $(Mn^{2+})_\epsilon{\cdot}nH_2O$ are chocolate in colour,
$Si_4Fe_3O_{10}(OH)_2/Si_4Fe_{3-\epsilon}O_{10}(OH)_2$, $(Fe^{2+})_\epsilon{\cdot}nH_2O$ are grey to rust in colour,
$Si_4Zn_3O_{10}(OH)_2/Si_4Zn_{3-\epsilon}O_{10}(OH)_2$, $(Zn^{2+})_\epsilon{\cdot}nH_2O$ are white in colour.

B/—Structural Analysis and Characterization

Various compositions of swelling TOT-TOT interlayer nanoparticles obtained by following the protocol described above were analyzed especially by X-ray diffraction.

The collected results are presented and discussed hereinbelow. They relate to four particular compositions of swelling TOT-TOT interlayer nanoparticles. In the present case, they are compositions of swelling TOT-TOT interlayer nanoparticles of the talc-stevensite type, prepared with a hydrothermal treatment at 220° C., at 16 bar and for 21 days.

The four compositions differ from one another by the water/solid ratios used in the hydrothermal treatment of the silicometallic gels —$Si_4Mg_3O_{11}$,n'$H_2O$—.

The compositions are designated R100, R50, R25 and R10, with reference to the water/solid ratio used (the amount of water being expressed in litres and the amount of solid in kg).

In particular, those ratios were obtained with the following mixtures:
composition R100: 30 ml of water to 300 mg of solid (solid fraction of the gel),
composition R50: 20 ml of water to 400 mg of solid,
composition R25: 20 ml of water to 800 mg of solid,
composition R10: 10 ml of water to 1000 mg of solid.
1/—X-Ray Diffraction Analyses FIG. 1 shows the results of X-ray diffraction analyses obtained with the above four compositions.

The diffractograms were recorded on an XPERT-MPD device (PanAnalytical). The 2θ measurement step is 0.01° with an accumulation time of 2 sec/step. The acceleration voltage is 40 kV and the intensity is 55 mA. The Bragg equation giving the structural equidistance is: $d_{hkl}=0.7703/\sin\theta$.

The RX diffractograms obtained exhibit, in the planes (020), (003) and (060), diffraction peaks whose positions are very close to those of the characteristic diffraction peaks of a natural talc:
for the plane (020), a peak located at a distance of 4.52-4.55 Å (4.55 Å for natural talc);

for the plane (003), a peak located at 3.14-3.18 Å (3.12 Å for natural talc);

for the plane (060), a peak located at 1.52-1.53 Å (1.53 Å for natural talc).

Regarding the plane (001), the position of the corresponding diffraction peaks is located at a distance varying between 9.71 Å and 10.32 Å. This distance is markedly different from the 9.35 Å which is representative of the plane (001) of a natural talc.

This shift of the peak corresponding to the plane (001) as well as the presence of a pointed peak at a distance of the order of 14-15 Å, especially at 14.6 Å, reflects an interlayering of the non-swelling talcose mineral phase with another mineral phase, stevensite, which forms the swelling mineral phase.

This is confirmed on the one hand by the finding that, the larger the relative amount of stevensite in the mineral particles, the greater the shift of the diffraction peak of the plane (001) towards the small diffraction angles. On the other hand, X-ray diffraction analysis was also carried out on oriented plates saturated with ethylene glycol and calcium, in order to confirm the presence of talc-stevensite interlayering.

The oriented plates were prepared according to the following protocol:

1. 15 mg of sample are placed in a 1.25 ml eppendorff, and a 1N CaCl$_2$ solution is added thereto; the mixture is vortexed for about thirty seconds and is then allowed to stand for about one hour,
2. the mixture is centrifuged at 7000 revolutions/minute for 15 minutes, and then the supernatant is removed,
3. the residue is resuspended in a 1N CaCl$_2$ solution; the mixture is vortexed for about thirty seconds and is then allowed to stand for about 12 hours,
4. the mixture is centrifuged at 7000 revolutions/minute for 15 minutes, and then the supernatant is removed,
5. the residue is washed with osmozed water: after addition of the osmozed water, the mixture is vortexed and treated with ultrasound for 10 seconds and is then allowed to stand for about one hour before being centrifuged at 7000 revolutions/minute for 15 minutes in order to remove the supernatant; this washing is repeated 5 times,
6. after washing, the residue, which corresponds to a product saturated with calcium, is taken up in osmozed water, and the mixture is vortexed for 30 seconds and treated with ultrasound for 10 seconds,
7. a sample of the solution so prepared is taken with the aid of a pipette and is deposited on a plate of glass,
8. once the plate has dried, ethylene glycol is sprayed onto it and allowed to act for 5 minutes; the plate is now saturated with calcium and with ethylene glycol and is ready for the analyses.

FIGS. 11a to 11d show the RX diffractograms obtained. Table 1 hereinbelow summarizes the data thereof.

The larger the area of a diffraction peak, the larger the amount of the mineral phase represented by that peak in the sample.

Peaks 1, 2 and 3 indicated in FIGS. 11a to 11d correspond to the stevensite component, to the component that is evidence of interlayering, and to the talc component, respectively. These three components form a talc-stevensite interlayer.

TABLE 1

| | | Position of the peak, $d_{hkl}$ (Å) | Diffraction angle (°2θ) | Intensity of the peak (counts/s) | Area of the peak |
|---|---|---|---|---|---|
| R100 | Peak 1 | 12.12 | 7.290 | 622 | 1.459 |
| | Peak 2 | 10.47 | 8.440 | 1328 | 1.081 |
| | Peak 3 | 9.43 | 9.370 | 3599 | 1.055 |
| R50 | Peak 1 | 18.65 | 4.735 | 4284 | 1.487 |
| | Peak 2 | 9.70 | 9.114 | 3018 | 1.282 |
| | Peak 3 | 9.09 | 9.720 | 4533 | 0.887 |
| R25 | Peak 1 | 18.65 | 4.735 | 10778 | 1.761 |
| | Peak 2 | 9.82 | 8.999 | 2729 | 1.148 |
| | Peak 3 | 9.09 | 9.720 | 7227 | 0.943 |
| R10 | Peak 1 | 18.37 | 4.807 | 22327 | 1.860 |
| | Peak 2 | 9.41 | 9.390 | 6421 | 1.476 |
| | Peak 3 | 9.01 | 9.810 | 6662 | 0.836 |

Likewise, with reference to the RX diffractogram shown in FIG. 10, measurement of the full width at half maximum of the peaks corresponding to the planes (001), (020), (003) and (060), relating to the non-swelling mineral phase, allows the effect of the water/solid ratio on the evolution of crystallinity to be assessed. For a given hydrothermal treatment temperature and time, the crystallinity of the swelling TOT-TOT interlayer nanoparticles increases with the water/solid ratio.

C/—General Protocol for the Thermal Conversion of Compositions of Swelling TOT-TOT Interlayer Nanoparticles of the Talc-Stevensite Type into Compositions of Synthetic Talcose Nanoparticles A composition of swelling TOT-TOT interlayer nanoparticles prepared according to the third preparation process as described hereinbefore is subjected, after drying and grinding, to an anhydrous thermal treatment. To that end, the composition is placed in a platinum crucible and is then heated. It is also possible to use a crucible made of ceramics or of any other appropriate material. The reaction is carried out at low pressure, less than 5 bar—especially at atmospheric pressure.

1/—Analysis and Characterization

The crystalline and lamellar structures of the swelling TOT-TOT interlayer nanoparticles and those of the resulting synthetic talcose nanoparticles were characterized by infrared spectroscopy and by X-ray diffraction. Only some of the collected data are presented in FIGS. 12, 13a, 13b, 14 and 15 and discussed hereinbelow.

a) Infrared analysis

FIG. 12 shows the results of analyses carried out in the mid-infrared range in transmission on:

- a composition of talc-stevensite swelling TOT-TOT interlayer nanoparticles (I.t.s.) prepared according to the general hydrothermal treatment protocol of the third preparation process described above, under the following particular conditions: the hydrothermal treatment is carried out at 220° C. for 24 hours with a distilled water/gel ratio of 0.83 (200 g of pulverulent composition to 166 cm$^3$ of water),
- a first composition of synthetic talcose nanoparticles (Ts 300° C.—5 h) obtained from the above composition of talc-stevensite swelling TOT-TOT interlayer nanoparticles (I.t.s.) and with an anhydrous thermal treatment at 300° C. for a period of 5 hours,
- a second composition of synthetic talcose nanoparticles (Ts 500° C.—5 h) obtained from the above composition of talc-stevensite swelling TOT-TOT interlayer nanoparticles (I.t.s.) and with an anhydrous thermal treatment at 500° C. for a period of 5 hours.

The infrared spectra were recorded using a NICOLET 510-FTIR spectrometer over a range of 4000 to 400 cm$^{-1}$.

In addition, FIGS. 13a and 13b show enlargements of the zones in which the vibration bands at 3678 cm$^{-1}$, 1018 cm$^{-1}$ and 669 cm$^{-1}$ are located.

Measurements were also carried out in diffuse reflection in the near-infrared range in order to show the pointed Mg$_3$—OH bond vibration at 7185 cm$^{-1}$. FIG. 14 shows an enlargement of the zone contained between 6000 cm$^{-1}$ and 8000 cm$^{-1}$.

The enlargement of the zone contained between 6000 cm$^{-1}$ and 8000 cm$^{-1}$ (FIG. 12) reveals a peak at 7265 cm$^{-1}$, close to the reference peak at 7185 cm$^{-1}$. The presence of this bond reflects a slight hydration of the nanoparticles obtained. Water molecules are still intercalated between the laminae corresponding to the structure of the talc.

These results show that an anhydrous thermal treatment effectively enables the composition of talc-stevensite swelling TOT-TOT interlayer nanoparticles to be converted into a composition of synthetic talcose nanoparticles. This conversion manifests itself especially in the presence of the four characteristic vibration bands of talc, the fineness of which substantially reflects the crystallinity of the mineral. The fineness of these four bands, and therefore the crystallinity of the mineral, increases gradually during the anhydrous thermal treatment and with the duration of the treatment.

Nevertheless, with an anhydrous thermal treatment carried out at a temperature of the order of only 300° C., a long time is required to obtain a degree of hydration similar to that of a natural talc.

On the other hand, with an anhydrous thermal treatment at a temperature of the order of 500° C., the treated mineral composition acquires a crystallinity and a degree of hydration that are very comparable with those of a natural talc in a relatively short time (after about 5 hours' treatment).

2/—X-Ray Diffraction Analyses

FIG. 15 shows the results of analyses carried out on:
the above composition of talc-stevensite swelling TOT-TOT interlayer nanoparticles (I.t.s.),
a first composition of synthetic talcose nanoparticles (Ts 300° C.) obtained from the above composition of talc-stevensite swelling TOT-TOT interlayer nanoparticles and with an anhydrous thermal treatment at 300° C. for a period of 5 hours,
a second composition of synthetic talcose nanoparticles (Ts 550° C.) obtained from the above composition of talc-stevensite swelling TOT-TOT interlayer nanoparticles and with an anhydrous thermal treatment at 550° C. for a period of 5 hours.

The RX diffractograms shown in FIG. 15 were recorded using an XPERT-MPD device (PanAnalytical). The 2θ measurement step is 0.01° with an accumulation time of 2 sec/step. The acceleration voltage is 40 kV, the intensity 55 mA. The Bragg equation giving the structural equidistance is: $d_{hkl}=0.7703/\sin\theta$.

These analyses confirm the observations made by infrared spectroscopy.

The characteristic peaks of talc intensify with an anhydrous thermal treatment both at 550° C. and at 300° C., and the intensity increases with the treatment time.

After only 5 hours of an anhydrous thermal treatment at 550° C., the characteristic diffraction peaks of talc sharpen. In particular, the diffraction peak of the plane (001) passes from a position at 9.64 Å to 9.50 Å; this is very close to the value of 9.35 Å characteristic of a natural talc. This difference in values may reflect a very small particle size of the nanoparticles (nanometric size) and/or slight residual hydration of the synthetic talcose nanoparticles, which increases the interreticular distance d(001) owing to the presence of water molecules intercalated between the laminae corresponding to the structure of the talc. However, it must be noted that this hydration is less and less pronounced as the anhydrous thermal treatment time becomes longer.

Measurement of the full width at half maximum of the peaks of the planes (001), (020), (003) and (060) shows the evolution of the crystallinity and confirms that, for a treatment temperature greater than 300° C., the longer the synthesis time, the greater the improvement in the crystallinity of the synthetic talcose nanoparticles (the full width at half maximum diminishes with the treatment time).

The RX diffractograms shown in FIG. 15 also reveal the presence of the characteristic diffraction peaks of sodium chloride (NaCl). The presence of these peaks is evidence of insufficient washing and rinsing of the silicometallic gel prior to the hydrothermal treatment. In the present case, the three compositions analyzed were prepared with only one cycle of washing of the silicometallic gel.

D/—Theoretical Structure of the Synthetic Nanoparticles Obtained

Referring to FIGS. 16 and 17, which show the crystalline structure in diagrammatic form, the synthetic talcose nanoparticles and resulting swelling TOT-TOT interlayer nanoparticles of the talc-stevensite type exhibit a microscopic organization in the form of superposed elementary laminae 1. Each lamina 1 has a crystalline structure composed of a layer of octahedrons 4 occupied by divalent metal cations, in the present case Mg$^{2+}$.

Each of the octahedral layers is intercalated between two layers of tetrahedrons 3.

Compared with the synthetic talcose nanoparticles, the crystalline structure of the talc-stevensite swelling TOT-TOT interlayer nanoparticles is characterized by the presence of metal cation voids 5 in the region of some octahedral sites of the elementary laminae 1. These cation voids explain the poor crystallinity observed especially on the RX diffractograms.

Compared with the synthetic talcose nanoparticles, the crystalline structure of the talc-stevensite swelling TOT-TOT interlayer nanoparticles is also characterized by an irregular stack of elementary laminae 1 and by the presence of interfoliar spaces 2 into which the water molecules and hydrated cations infiltrate. These cations which have infiltrated into the interfoliar spaces 2 allow the loss of charge due to the cation voids 5 in the mineral phase to be compensated for. The crystal edifice thus remains in a relatively neutral state.

The interfoliar cations are bonded weakly to the remainder of the lattice and are accordingly capable of being exchanged for other cations. Likewise, the interfoliar spaces 2 are more or less expansible. Various substances can be introduced into the interfoliar spaces.

The anhydrous thermal treatment tests on the synthetic swelling TOT-TOT interlayer nanoparticles of the talc-stevensite type resulted in the conversion of that synthetic mineral into synthetic talcose nanoparticles. In particular, a gradual sharpening of the characteristic RX diffraction peaks in the region of the planes (001), (020), (003) and (060) is observed, which reflects an improvement in the crystallinity of the laminae 1. Gradually, the voids 5 are filled with the cations of the interfoliar spaces 2. And, concomitantly, the interfoliar spaces become smaller (passing from 12 Å to values of the order of 9.4-9.6 Å); in the plane (001), the characteristic diffraction peak is close to the distance 9.35 Å.

EXAMPLE 3

Preparation of Synthetic Talcose Nanoparticles According to the Second Preparation Process A/—Synthesis Protocol for a Composition of Synthetic Talcose Nanoparticles The synthetic talcose nanoparticles are prepared according to the second preparation process, which comprises the anhydrous thermal treatment of a kerolite composition. The anhydrous thermal treatment is carried out at low pressure, less than 5 bar (for example at atmospheric pressure), and at a temperature greater than 300° C.

This anhydrous thermal treatment allows a kerolite to be converted into perfectly crystallized and thermally stable synthetic talcose nanoparticles. The particle size of the synthetic talcose nanoparticles can be determined and adjusted in dependence on the characteristics of the starting kerolite and on the process used to prepare that kerolite.

1/—Preparation of the Silicometallic Gel

The silicometallic gel is prepared by a coprecipitation reaction according to the following equation:

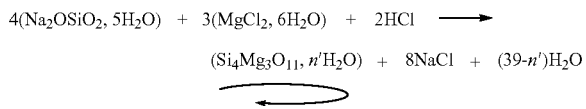

The coprecipitation reaction allows a hydrated silicometallic gel having the stoichiometry of talc (4 Si to 3 Mg) to be obtained. It is carried out starting from:

1. an aqueous solution of penta-hydrated sodium metasilicate, prepared by diluting 0.1 mole of sodium metasilicate in 250 cm$^{-3}$ of distilled water,
2. a solution of magnesium chloride, prepared by diluting 0.075 mole of magnesium chloride (in the form of hygroscopic crystals) in 50 cm$^{-3}$ of distilled water, and
3. 50 cm$^{-3}$ of 1N hydrochloric acid.

The silicometallic gel is prepared according to the following protocol:

1. the solutions of hydrochloric acid and of magnesium chloride are mixed,
2. the mixture is added to the solution of sodium metasilicate; the coprecipitation gel forms instantly,
3. after centrifugation (7000 revolutions per minute for 15 minutes) and removal of the supernatant (sodium chloride solution that has formed), a gel is recovered,
4. the gel is washed with water, for example with distilled water, osmozed water or simply with tap water (a minimum of two washing/centrifugation cycles).

At the end of this first phase, a highly hydrated, white silicometallic gel $Si_4Mg_3O_{11}$,n'$H_2O$ is obtained. Its consistency is gelatinous.

2/—Treatment of the Silicometallic Gel to Yield a Kerolite Composition

Before the silicometallic gel is subjected to a hydrothermal treatment to give a kerolite composition, the gel, which is of gelatinous texture, is dried for two days in an oven at 60° C. This relatively long drying time is explained by the considerable hydration of the gel collected after centrifugation.

The resulting silicometallic aggregates are ground with an agate mortar until a homogeneous powder is obtained.

The pulverulent silicometallic composition is then subjected to a hydrothermal treatment to give a kerolite composition. To this end:

1. the pulverulent silicometallic composition is placed in a reactor (autoclave) with distilled water in a liquid/solid ratio of 0.83 (for example 200 g of pulverulent composition to 166 cm$^3$ of water),
2. the reactor is placed in an oven at a temperature of the order of 220° C. and for a treatment time of one day or more,
3. when the hydrothermal treatment is complete, the solid material of the reaction medium is filtered off and then dried.

There is ultimately obtained a solid, white, divided composition corresponding to a synthetic kerolite composition.

3/—Anhydrous Thermal Treatment of the Kerolite Composition

The kerolite composition previously prepared is then subjected to an anhydrous thermal treatment. To this end, it is placed in a platinum crucible and then heated. It is also possible to use a crucible made of ceramics or of any other material suitable for the treatment temperature. Heating of said composition is carried out at atmospheric pressure.

B/—Structural Analysis and Characterization of the Resulting Nanoparticles

The lamellar and crystalline structures of the kerolite nanoparticles and of the synthetic talcose nanoparticles obtained were characterized by transmission and diffuse reflection infrared spectroscopy and by X-ray diffraction. The collected data are presented in FIGS. 18, 19a, 19b, 20, 21 and 22 and are discussed hereinbelow.

1/—Infrared Analysis

FIG. 18 shows the results of analyses carried out in the mid-infrared range on:
- a kerolite composition (Ker.) prepared according to the method described above,
- a first composition of synthetic talcose nanoparticles (Ts 300° C.—5 h) obtained from the above kerolite composition and with an anhydrous thermal treatment at 300° C. for 5 hours,
- a second composition of synthetic talcose nanoparticles (Ts 500° C.—5 h) obtained from the above kerolite composition and with an anhydrous thermal treatment at 500° C. for 5 hours.

The infrared spectra were recorded using a Nicolet 510-FTIR spectrometer over a range of 4000 to 400 cm$^{-1}$.

In addition, FIGS. 19a and 19b show enlargements of the zones in which the vibration bands at 3678 cm$^{-1}$, 1018 cm$^{-1}$ and 669 cm$^{-1}$ are located.

Measurements were also carried out in diffuse reflection in the near-infrared range in order to show the pointed $Mg_3$—OH bond vibration at 7185 cm$^{-1}$. FIG. 20 shows an enlargement of the zone contained between 6000 cm$^{-1}$ and 8000 cm$^{-1}$.

These results show that an anhydrous thermal treatment can permit the conversion of a synthetic kerolite composition into a composition of synthetic talcose nanoparticles. This conversion manifests itself especially in the appearance of the four vibration bands characteristic of the structure of talc, the fineness of which substantially reflects the crystallinity of the mineral.

The inventors have also found that the fineness of those four bands, and therefore the crystallinity of the treated mineral, increases gradually during the anhydrous thermal treatment and with the duration of that treatment.

It should nevertheless be noted that the enlargement of the zone contained between 6000 cm$^{-1}$ and 8000 cm$^{-1}$ (FIG. 20) reveals a peak at 7265 cm$^{-1}$, close to the reference peak at 7185 cm$^{-1}$. The presence of this bond reflects slight hydration of the resulting product. Water molecules are intercalated between the laminae corresponding to the structure of the talc.

The preceding analyses confirm that an anhydrous thermal treatment, especially at 300° C. or at 500° C., allows a kerolite composition to be converted into a composition of synthetic talcose nanoparticles. Nevertheless, with an anhydrous thermal treatment carried out at a temperature of the order of only 300° C., a long time is required to obtain a degree of hydration similar to that of a natural talc.

With an anhydrous thermal treatment at a temperature of the order of 500° C., on the other hand, the treated mineral composition acquires a crystallinity and a degree of hydration that are very comparable with those of a natural talc in a relatively short time (after about 5 hours' treatment).

2/—X-Ray Diffraction Analyses

FIG. 21 shows the results of analyses carried out on:
 a synthetic kerolite composition (Ker.) prepared according to the coprecipitation method described above,
 a first composition of synthetic talcose nanoparticles (Ts 300° C.) obtained from the above kerolite composition and with an anhydrous thermal treatment at 300° C. for 5 hours,
 a second composition of synthetic talcose nanoparticles (Ts 550° C.) obtained from the above kerolite composition and with an anhydrous thermal treatment at 550° C. for 5 hours.

The diffractograms shown in FIG. 21 were recorded using an XPERT-MPD PanAnalytical device.

The 2θ measurement step is 0.01° with an accumulation time of 2 sec/step. The acceleration voltage is 40 kV, the intensity 55 mA. The Bragg equation giving the structural equidistance is: $d_{hkl}=0.7703/\sin\theta$.

These analyses confirm the observations made by infrared spectroscopy.

The peaks characteristic of the structure of the talc intensify with an anhydrous thermal treatment both at 550° C. and at 300° C., and that intensity increases with the treatment time.

After only 5 hours of anhydrous thermal treatment at 550° C., the diffraction peaks characteristic of the structure of the talc become sharper. In particular, the diffraction peak corresponding to the plane (001) passes from a position at 9.64 Å to 9.50 Å; this is very close to the value of 9.35 Å characteristic of a natural talc. This difference in values reflects a very slight residual hydration of the synthetic talcose nanoparticles and/or a very small size of the nanoparticles (nanometric size). However, it must be noted that the hydration becomes less and less pronounced as the anhydrous thermal treatment time increases.

Measurement of the full width at half maximum of the peaks of the planes (001), (020), (003) and (060) shows the evolution of the crystallinity and confirms that, for a treatment temperature greater than 300° C., the longer the synthesis time, the greater the improvement in the crystallinity of the nanoparticles (the full width at half maximum diminishes with the treatment time).

The diffractograms shown in FIG. 21 also reveal the presence of the characteristic diffraction peaks of sodium chloride (NaCl). The presence of these peaks is evidence of insufficient washing and rinsing of the silicometallic gel prior to the hydrothermal treatment. In the present case, the three compositions analyzed were prepared with only one cycle of washing of the silicometallic gel.

For comparison purposes, FIG. 22 shows an RX diffractogram of a sample of synthetic talcose nanoparticles (Talc synth.) of nanometric size, from 20 to 100 nm, and of a sample of natural talc (Talc nat.) according to the prior art, which has been ground mechanically to give particles having a particle size of the order of from 70 to 120 nm.

A first difference between the natural talc and the synthetic talcose nanoparticles appears in the position of the diffraction peaks corresponding to the planes (001) and (003):
 for the plane (001): 9.43 Å for the synthetic talcose nanoparticles instead of 9.36 Å for the natural talc;
 for the plane (003): 3.16 Å for the synthetic talcose nanoparticles instead of 3.12 Å for the natural talc.

The nanometric natural talc (Talc nat.) also differs from the synthetic talcose nanoparticles (Talc synth.) in that the intensity of the diffraction peaks is much weaker.

In addition, as compared with the synthetic talcose nanoparticles of nanometric size, the natural nanometric talc exhibits diffraction peaks with larger full widths at half maximum (for the same preparation and an identical counting time). These data reflect the better crystallinity of the synthetic talcose nanoparticles. Intensive grinding of a natural talc to give a talc of nanometric size leads to considerable amorphization of the product.

C/—Theoretical Structure of the Synthetic Kerolite Particles Obtained According to the Invention The synthetic talcose nanoparticles and the synthetic kerolite nanoparticles have a microscopic organization in the form of superposed elementary laminae, similar to that shown in FIGS. 16 and 17, the number of which varies from several units to several tens of units.

For both the synthetic talcose nanoparticles and the synthetic kerolite nanoparticles, the crystalline structure of the elementary laminae is constituted by the association of two tetrahedral layers located on either side of an octahedral layer.

The octahedral layer is formed by two planes of $O^{2-}$ and $OH^-$ ions (in the molar ratio $O^{2-}/OH^-$ of 2:1). On either side of this median layer there are arranged three-dimensional networks of tetrahedrons, one of the vertices of which is occupied by an oxygen common to the tetrahedral layer and to the octahedral layer, while the other three are occupied by substantially coplanar oxygens belonging to a tetrahedral layer.

The tetrahedral cavities are occupied by $Si^{4+}$ ions and the octahedral cavities by $Mg^{2+}$ cations.

Unlike the synthetic talcose nanoparticles, the crystal lattice of the synthetic kerolite nanoparticles has voids; a small proportion of the octahedral sites is unoccupied. This results in a cation deficit. The cation deficit is in large part filled by the presence of cations, called compensatory cations, which occupy the interfoliar spaces. These interfoliar spaces, which are highly hydrated, also constitute a distinctive feature of the crystalline structure of kerolites as compared with that of pure talcs.

The voids explain the low degree of crystallinity observed especially on the RX diffractograms.

The anhydrous thermal treatment tests on the synthetic kerolite compositions have shown that the compositions are converted into compositions of synthetic talcose nanoparticles. In particular, a gradual sharpening of the characteristic diffraction peaks in the region of the planes (001), (020), (003) and (060) is observed, which reflects an improvement in the crystallinity of the laminae Gradually, the voids are filled with the cations of the interfoliar spaces. And, concomitantly, the interfoliar spaces become smaller (passing from 12 Å to values of the order of 9.4-9.6 Å); in the plane (001), the characteristic diffraction peak is close to the distance 9.35 Å, which is characteristic of a natural talc.

EXAMPLE 4

Composite Coating Based on Nickel

The synthetic nanoparticles obtained in Examples 1 to 3 are hydrophilic lamellar synthetic phyllosilicated nanoparticles which can be used to produce a lubricating composite coating by electrolytic deposition, comprising a metal matrix in which the nanoparticles are dispersed.

In Example 4, the coating was prepared in an electrochemical cell composed of a 4 cm$^2$ nickel anode and a 1.762 cm$^2$ copper cathode on which the deposition is carried out.

The electrochemical cell contains an electrolyte having a pH of 4.5 and the following composition:

| | |
|---|---|
| $NiSO_4, 6H_2O$: | 280 g · l$^{-1}$ |
| $NiCl_2, 6H_2O$: | 30 g · l$^{-1}$ |
| $H_3BO_3$: | 45 g · l$^{-1}$ |
| $Na_2SO_4$: | 50 g · l$^{-1}$ |

50 g · l$^{-1}$ of synthetic talcose nanoparticles having an average size of the order of 100 nm, prepared as described in Example 3 according to the second preparation process with hydrothermal treatment at 350° C. and subsequent thermal treatment at 550° C.

The deposition is carried out by maintaining the electrolyte at a temperature of 55° C. under a current density of 2.5 A.dm$^2$ for a period of 1½ hours.

The structure of the resulting coating is shown diagrammatically in FIG. 23. As will be noted, the composite material forming the coating comprises metal grains 5 in which synthetic talcose nanoparticles 6 are incorporated. The nanoparticles, whose size is much smaller than the average size of the metal grains, do not modify the surface condition of the coating and do not impair the formation of the metal deposit in any way.

It will be noted that, in a process for the preparation of a coating according to the prior art with natural talc according to WO 2004/063428, the appearance of a stable voluminous foam by accumulation of hydrogen on the hydrophobic faces of the talc particles is noted. In a process for the preparation of the coating according to the invention, on the other hand, no appearance of foam is noted.

EXAMPLE 5

Composite Coating Based on NiP

Into an electrochemical cell analogous to that used in Example 4 there was introduced an electrolyte having a pH of 2 and the following composition:

| | |
|---|---|
| $NiSO_4, 6H_2O$ | 210 g · l$^{-1}$ |
| $NiCl_2, 6H_2O$ | 60 g · l$^{-1}$ |
| $H_3PO_4$ | 45 g · l$^{-1}$ |
| $H_3PO_3$ | 0-15 g · l$^{-1}$ |
| $Na_2SO_4$ | 50 g · l$^{-1}$ |

50 g · l$^{-1}$ of synthetic talcose nanoparticles having an average size of the order of 100 nm, prepared as described in Example 3 according to the second preparation process with hydrothermal treatment at 350° C. and subsequent thermal treatment at 550° C.

The deposition is carried out by maintaining the electrolyte at a temperature of 80° C. for a period of 45 minutes.

Several samples were thus prepared by varying the current density. The table below shows the noted deposition speed (which is linked directly to the thickness of the resulting deposit) as a function of the applied current density.

| I (A · dm$^{-2}$) | Deposition speed (μm · h$^{-1}$) |
|---|---|
| 10 | 77.3 |
| 5 | 40 |
| 3 | 23 |
| 2 | 15 |
| 1 | 8 |
| 0.5 | 4 |

EXAMPLE 6

Composite Coating Based on ZnNi/Synthetic Talcose Nanoparticles

Into an electrochemical cell analogous to that used in Example 4 there was introduced an electrolyte having a pH of 2 and the following composition:

| | |
|---|---|
| $ZnCl_2$ | 93.7 g · l$^{-1}$ |
| $NiCl_2, 6H_2O$ | 9.3 g · l$^{-1}$ |
| KCl | 200 g · l$^{-1}$ |

50 g · l$^{-1}$ of synthetic talcose nanoparticles having an average size of the order of 100 nm, prepared as described in Example 3 according to the second preparation process with hydrothermal treatment at 350° C. and subsequent thermal treatment at 550° C.

The deposition is carried out by maintaining the electrolyte at a temperature of 55° C. under a current density of 5 A.dm$^{-2}$ for a period of 12 minutes.

Instead of the electrochemical deposition of Example 4, a composite coating according to the invention can be produced by electrolytic deposition of the chemical type.

EXAMPLE 7

Composite Coating by Chemical Means NiP/Synthetic Talcose Nanoparticles ("Electroless")

The coating is prepared in a cell containing a 1.8 cm$^2$ steel substrate previously coated with a 1 micron layer of nickel. The cell contains an electrolyte having a pH of 4.5 and the following composition:

| | |
|---|---|
| $NiSO_4, 6H_2O$ | 280 g · l$^{-1}$ |
| $NiCl_2, 6H_2O$ | 30 g · l$^{-1}$ |
| $NaH_2PO_2$ | 1 to 30 g · l$^{-1}$ |

50 g · l$^{-1}$ of synthetic talcose nanoparticles having an average size of the order of 100 nm, prepared as described in Example 3 according to the second preparation process with hydrothermal treatment at 350° C. and subsequent thermal treatment at 550° C.

EXAMPLE 8

Composite Coatings Based on Ni—Co

In this example, the coatings were prepared in an electrochemical cell analogous to that used in Example 4, with an electrolyte having the following composition:

| | |
|---|---|
| $Co(CH_3CO_2), nH_2O$ | 10 g · l$^{-1}$ |
| $Ni(CH_3CO_2), nH_2O$ | 100 g · l$^{-1}$ |
| $NiCl_2$ | 40 g · l$^{-1}$ |
| $H_3BO_3$ | 40 g · l$^{-1}$ |

Composite coatings having a nickel-cobalt matrix were produced from synthetic talcose nanoparticles prepared according to the first preparation process as described in Example 1.

Two methods were studied: firstly, synthetic talcose nanoparticles dried on leaving the hydrothermal reactor and then ground and suspended in the electrolyte, and secondly synthetic talcose nanoparticles obtained directly from the reactor, dispersed in the synthesis water (without being either dried or ground). The latter method on the one hand allows two steps of the process to be omitted and handling of the nanometric powders to be avoided. Moreover, their stability in suspension (low sedimentation speed) is far superior to that of dry powders. The dispersion state of the powders on leaving the hydrothermal reactor is therefore much more satisfactory than in the case of the dried and ground synthetic talcose nanoparticle powders.

With or without drying, the conditions of the hydrothermal treatment were as follows: 300° C., $90 \cdot 10^5$ Pa, with a duration of 6 hours or 15 days.

It has been shown that the presence of dispersed nanoparticles in the electrolyte causes a refinement and modification of the microstructure of the electrochemical deposits. The deposits produced from suspensions comprising synthetic talcose nanoparticles obtained directly from the reactor without a drying step and then dispersed in the electrolyte yield a smoother coating and valuable tribological properties, incorporating synthetic talcose nanoparticles dispersed between the granules, which are readily visible with a TEM microscope (×40,000), at particle concentrations that are 2.5 times lower than in the case of the dried and ground synthetic talcose nanoparticle powders.

The invention claimed is:

1. A composite material comprising a metal matrix within which lamellar phyllosilicated mineral particles are distributed, wherein said lamellar phyllosilicated mineral particles are hydrophilic synthetic lamellar silico/germano-metallic mineral particles, called synthetic phyllosilicated nanoparticles, having an average size of from 10 nm to 1 μm, and the synthetic phyllosilicated nanoparticles are less than 20% by volume of said composite material.

2. The composite material as claimed in claim 1, wherein the synthetic phyllosilicated nanoparticles are selected from the group consisting of:
   1) nanoparticles, called synthetic silico/germano-metallic nanoparticles, of the formula —$(Si_xGe_{1-x})_4M_3O_{10}(OH)_2$— in which:
   M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) being a real number of the interval [0; 1], such that $$\sum_{i=1}^{8} y(i) = 1,$$

x is a real number of the interval [0; 1],
an X-ray diffraction analysis of said synthetic silico/germano-metallic mineral nanoparticles yields a diffractogram exhibiting the following characteristic diffraction peaks:
a peak located at a distance of the order of 9.40-9.68 Å, for a plane (001);
a peak located at 4.50-4.75 Å, for a plane (020);
a peak located at 3.10-3.20 Å, for a plane (003);
a peak located at 1.50-1.55 Å, for a plane (060), and 2) synthetic lamellar phyllosilicated mineral nanoparticles, called swelling TOT-TOT interlayer nanoparticles, formed by interlayering between:
at least one non-swelling mineral phase formed by a stack of elementary laminae of the 2/1 phyllogermanosilicate type and having the chemical formula —$(Si_xGe_{1-x})_4M_3O_{10}(OH)_2$— and
at least one swelling mineral phase formed by a stack of elementary laminae of the 2/1 phyllogermanosilicate type and at least one interfoliar space between two consecutive elementary laminae; said swelling mineral phase having the chemical formula —$(Si_xGe_{1-x})_4M_{3-\epsilon}O_{10}(OH)_2, (M^{2+})_{\epsilon'}.nH_2O$—, in which chemical formulae:
M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y (i) representing a real number of the interval [0; 1], such that $$\sum_{i=1}^{8} y(i) = 1,$$

x is a real number of the interval [0; 1],
$\epsilon$ and $\epsilon'$ relate to the cation deficit of the elementary laminae of the swelling phase and to the cations present in the interfoliar space(s), respectively,
an X-ray diffraction analysis of said swelling TOT-TOT interlayer nanoparticles yields a diffractogram exhibiting the following characteristic diffraction peaks:
a plane (001) located at a distance of the order of 14-15 Å, representing said swelling mineral phase,
planes representing said non-swelling mineral phase:
a plane (001) located at a distance of the order of 9.60-10.50 Å;
a plane (020) located at 4.50-4.60 Å;
a plane (003) located at 3.10-3.20 Å; and
a plane (060) located at 1.50-1.55 Å.

3. The composite material as claimed in claim 2, wherein said synthetic silico/germano-metallic nanoparticles exhibit a diffraction peak corresponding to the plane (001) located at a distance of the order of 9.55-9.65 Å.

4. The composite material as claimed in claim 1, wherein the synthetic silico/germano-metallic nanoparticles are nanoparticles of the formula $Si_4Mg_3O_{10}(OH)_2$ and the X-ray diffraction analysis of said synthetic silico/germano-metallic nanoparticles yielding a diffractogram exhibiting the following characteristic diffraction peaks:
a peak located at 9.40-9.68 Å, corresponding to a plane (001);
a peak located at 4.50-4.60 Å, corresponding to a plane (020);
a peak located at 3.10-3.20 Å, corresponding to a plane (003); and
a peak located at 1.50-1.55 Å, corresponding to a plane (060).

5. The composite material as claimed in claim 4, wherein said synthetic silico/germano-metallic mineral nanoparticles exhibit a diffraction peak corresponding to the plane (001) located at a distance of the order of 9.40-9.43 Å.

6. The composite material as claimed in claim 1, wherein said synthetic phyllosilicated nanoparticles have a unimodal and monodisperse particle size distribution.

7. The composite material as claimed in claim 1, wherein said synthetic phyllosilicated nanoparticles have an average size less than 500 nm.

8. The composite material as claimed in claim 1, wherein said synthetic phyllosilicated nanoparticles are distributed in an individualized and dispersed manner within the metal matrix.

9. The composite material as claimed in claim 1, wherein said metal matrix is from the group consisting of: a metal selected from the group consisting of Fe, Co, Ni, Mn, Cr, Cu, W, Mo, Zn, Au, Ag, Pt, and Sn; an intermetallic compound including a plurality of the said metals, an alloy of a plurality of said metals; and an alloy including at least one of said metals with a metalloid.

10. The composite material as claimed in claim 9, wherein said metal matrix is selected from the group consisting of: nickel, a metal alloy of nickel with other metals, and an alloy of nickel with a metalloid.

11. A substrate carrying a lubricating coating, wherein said coating is composed of a composite material according to claim 1.

12. The substrate as claimed in claim 11, wherein said substrate is composed of an intrinsically conductive material.

13. The substrate as claimed in claim 11, wherein said substrate is composed of an insulating or semi-conducting material whose surface to be treated has been rendered conductive by a preliminary metallization step.

14. A process for the deposition on a substrate of a coating composed of a composite material comprising a metal matrix within which there are distributed lamellar phyllosilicated mineral particles, said process comprising:

carrying out an electrolytic deposition using a solution of precursors of the metal matrix of the coating, said solution further comprising hydrophilic synthetic lamellar silico/germano-metallic mineral nanoparticles, called synthetic phyllosilicated nanoparticles, having an average size of from 10 nm to 1 µm, the synthetic phyllosilicated nanoparticles being less than 20% by volume of said coating.

15. The process as claimed in claim 14, wherein it is carried out chemically, by bringing the surface of the substrate to be coated into contact with the solution containing the precursors of the metal matrix, the synthetic phyllosilicated nanoparticles, as well as a compound acting as catalyst for the oxidation-reduction of the precursors of the metal matrix of the coating.

16. The process as claimed in claim 14, wherein it is carried out electrochemically in an electrochemical cell in which said substrate to be coated constitutes the cathode and the electrolyte is a solution of precursors of the metal matrix of the coating, said solution further contains the synthetic phyllosilicated nanoparticles.

17. The process as claimed in claim 16, wherein the anode of the electrochemical cell is composed of the metal forming the matrix or of an insoluble anode.

18. The process as claimed in claim 14, wherein the precursors of the metal matrix are selected from complexed or non-complexed ionic compounds reducible in solution by chemical means or by the supply of electrons.

19. The composite material as claimed in claim 7, wherein said synthetic phyllosilicated nanoparticles have an average size of from 20 nm to 100 nm.

* * * * *

UNITED STATES PATENT AND TRADEMARK OFFICE
CERTIFICATE OF CORRECTION

PATENT NO. : 8,466,095 B2
APPLICATION NO. : 12/809672
DATED : June 18, 2013
INVENTOR(S) : Martin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
Eighth Day of September, 2015

Michelle K. Lee
*Director of the United States Patent and Trademark Office*